(12) United States Patent
Wang et al.

(10) Patent No.: US 12,432,359 B2
(45) Date of Patent: *Sep. 30, 2025

(54) FLEXIBLE TILE SIGNALING IN VIDEO CODING

(71) Applicant: Huawei Technologies Co., Ltd., Shenzhen (CN)

(72) Inventors: Ye-Kui Wang, San Diego, CA (US); FNU Hendry, San Diego, CA (US); Maxim Borisovitch Sychev, Plano, TX (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/756,438

(22) Filed: Jun. 27, 2024

(65) Prior Publication Data

US 2025/0008120 A1    Jan. 2, 2025

Related U.S. Application Data

(63) Continuation of application No. 18/178,196, filed on Mar. 3, 2023, now Pat. No. 12,058,347, which is a (Continued)

(51) Int. Cl.
 *H04N 19/174*    (2014.01)
 *H04N 19/119*    (2014.01)
 (Continued)

(52) U.S. Cl.
 CPC ......... *H04N 19/174* (2014.11); *H04N 19/119* (2014.11); *H04N 19/172* (2014.11); (Continued)

(58) Field of Classification Search
 CPC .................................................. H04N 19/174
 See application file for complete search history.

(56) References Cited

U.S. PATENT DOCUMENTS 9,270,994 B2   2/2016   Fuldseth
2013/0101035 A1  4/2013   Wang et al.
(Continued)

FOREIGN PATENT DOCUMENTS

EP    2811742 A1   12/2014
EP    3902260 A1   10/2021
(Continued)

OTHER PUBLICATIONS

Document: JVET-L0394-v1, Wenger, S., "On Conflicting Uses of Tiles," Joint Video Experts Team (JVET) of ITU-T SG 16 WP 3 and ISO/IEC JTC 1/SC 29/WG 11, 12th Meeting: Macao, CN, Oct. 3-12, 2018, 6 pages.

(Continued)

*Primary Examiner* — Jerry T Jean Baptiste
(74) *Attorney, Agent, or Firm* — Conley Rose, P.C.

(57) ABSTRACT

A video coding mechanism is disclosed. The mechanism includes partitioning a picture into a plurality of first level tiles. A subset of the first level tiles is partitioned into a plurality of second level tiles. The first level tiles and the second level tiles are encoded into a bitstream. A split indication is encoded into the bitstream. The split indication indicates that at least one of the first level tiles is split into the second level tiles. The bitstream is stored for communication toward a decoder.

20 Claims, 11 Drawing Sheets

Related U.S. Application Data continuation of application No. 17/357,730, filed on Jun. 24, 2021, now Pat. No. 11,616,961, which is a continuation of application No. PCT/US2019/068790, filed on Dec. 27, 2019.

(60) Provisional application No. 62/785,511, filed on Dec. 27, 2018.

(51) Int. Cl.
| | |
|---|---|
| H04N 19/172 | (2014.01) |
| H04N 19/30 | (2014.01) |
| H04N 19/44 | (2014.01) |
| H04N 19/66 | (2014.01) |
| H04N 19/70 | (2014.01) |
| H04N 19/176 | (2014.01) |

(52) U.S. Cl.
CPC .............. *H04N 19/30* (2014.11); *H04N 19/44* (2014.11); *H04N 19/66* (2014.11); *H04N 19/70* (2014.11); *H04N 19/176* (2014.11)

(56) References Cited

U.S. PATENT DOCUMENTS

| | | | |
|---|---|---|---|
| 2013/0202051 | A1 | 8/2013 | Zhou |
| 2013/0308709 | A1 | 11/2013 | Norkin et al. |
| 2014/0003525 | A1 | 1/2014 | Fuldseth |
| 2014/0086330 | A1 | 3/2014 | Zhou |
| 2014/0307787 | A1 | 10/2014 | Zheng et al. |
| 2015/0023407 | A1 | 1/2015 | Sato |
| 2017/0178386 | A1 | 6/2017 | Redshaw et al. |
| 2018/0182066 | A1 | 6/2018 | Saleh et al. |
| 2018/0348961 | A1 | 12/2018 | Wilczynski et al. |
| 2021/0127111 | A1 | 4/2021 | George et al. |
| 2021/0152828 | A1* | 5/2021 | Sjöberg ................. H04N 19/172 |
| 2021/0329264 | A1 | 10/2021 | Wang et al. |

FOREIGN PATENT DOCUMENTS

| | | |
|---|---|---|
| EP | 3903491 A1 | 11/2021 |
| JP | 2021524706 A | 9/2021 |
| WO | 2013063094 A1 | 5/2013 |
| WO | 2014120367 A1 | 8/2014 |
| WO | 2014002619 A1 | 5/2016 |
| WO | 2019243539 A1 | 12/2019 |

OTHER PUBLICATIONS

Document: JVET-MO130-v1, Wang, Y-K., et al., "On tile Grouping" Joint Video Experts Team (JVET) of ITU-T SG 16 WP 3 and ISO/IEC JTC 1/SC 29/WG 11, 13th Meeting: Marrakech, MA, Jan. 9-18, 2019, 8 pages.
Document: JVET-10374-v2, Deshpande, S., et al., "On Tile Information Signaling for VVC," Joint Video Experts Team (JVET) of ITU-T SG 16 WP 3 and ISO/IEC JTC 1/SC 29/WG 11, 12th Meeting: Macao, CN, Oct. 3-12, 2018, 9 pages.
Document: JVET-L0415-v1, Sjoberg, R., et al., "Tile groups for VVC," Joint Video Experts Team (JVET) of ITU-T SG 16WP 3 and ISO/IEC JTC 1/SC 29/WG 11, JVET-L0415-v1, 12th Meeting: Macao, CN, Oct. 3-12, 2018, 5 pages.
"Line Transmission of Non-Telephone Signals, Video Codec for Audiovisual Services at p x 64 kbits," ITU-T, H.261, Mar. 1993, 29 pages.
"Transmission of Non-Telephone Signals, Information Technology—Generic Coding of Moving Pictures and Associated Audio Information: Video," H.262, Jul. 1995, 211 pages.
"Series H: Audiovisual and Multimedia Systems, Infrastructure of audiovisual services—Coding of moving video, Video coding for low bit rate communication," ITU-T, H.263, Jan. 2005, 226 pages.
"Series H: Audiovisual and Multimedia Systems, Infrastructure of audiovisual services—Coding of moving video, Advanced video coding for generic audiovisual services," ITU-T, H.264, Jun. 2019, 836 pages.
"Series H: Audiovisual and Multimedia Systesm, Infrastructure of audiovisual services—Coding of moving video, High efficiency video coding," H.265, Apr. 2013, 317 pages.
Bross, B., et al., "Versatile Video Coding (Draft 3)," JVET-L1001-v3, Oct. 3-12, 2018, 181 pages.
Document: JVET-L0686-v2, "Spec text for the agreed starting point on slicing and tiling," Joint Video Experts Team (JVET) of ITU-T SG 16 WP 3 and ISO/IEC JTC 1/SC 29/WG 11, 12th Meeting: Macao, CN, Oct. 3-12, 2018, 1 page.
Wang, Y.K. et al., "WD 3 of ISO/IEC 23090-2 OMAF 2nd edition," International Organisation for Standardisation Organisation Internationale De Normalisation ISO/IEC JTC1/SC29/WG11 N17963-v1, Oct. 2018, 235 pages.
Document: JVET-L0114-v1, "On slicing and tiling in VVC," Joint Video Experts Team (JVET) of ITU-T SG 16 WP 3 and ISO/IEC JTC 1/SC 29/WG 11, 12th Meeting: Macao, CN, Oct. 3-12, 2018, 5 pages.
Document: JCTVC-AC1005-v2, "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11, 29th Meeting: Macao, CN, Oct. 19-25, 2017, 56 pages.
Skupin, R., et al., "Tile Based HEVC Video for Head Mounted Displays", 2016 IEEE International Symposium On Multimedia (ISM), 2016, 2 pages.
JCTVC-10118 m24357, Zhou M., "AHG4: Enable parallel decoding with tiles", Joint Collaborative Team on Video Coding (JCT-VC) of ITU-T SG16 WP3 and ISO/IEC JTC1/SC29/WG11, 9th Meeting: Geneva, Switzerland, Apr. 27-May 7, 2012, 9 pages.
JVET-M0123_r1, He, Y., et al., "AHG12: On hierarchical tile design", Joint Video Experts Team (JVET) of ITU-T SG 16 WP 3 and ISO/IEC JTC 1/SC 29/WG 11, 13th Meeting: Marrakech, MA, Jan. 9-18, 2019, 9 pages.
JVET-M0129-v1, Wang, Y.K., et al., "AHG12: On flexible tiling", Joint Video Experts Team (JVET) of ITU-T SG 16 WP 3 and ISO/IEC JTC 1/SC 29/WVG 11, 13th Meeting: Marrakech, MA, Jan. 9-18, 2019, 8 pages.
JVET-K1001-v5, Wang, Y.K., et al., "Versatile Video Coding (Draft 2)", Joint Video Experts Team (JVET) of ITU-T SG 16 WP 3 and ISO/IEC JTC 1/SC 29/WG 11, 11th Meeting: Ljubljana, SI, Jul. 10-18, 2018, 135 pages.
3GPP TS 36.321 V13.2.0, "3rd Generation Partnership Project; Technical Specification Group Radio Access Network; Evolved Universal Terrestrial Radio Access (E-UTRA); Medium Access Control (MAC) protocol specification (Release 13)," Jun. 2016, 91 pages.
Document: JVET-L0127, He, Y., et al., "On VVC tile design," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
Sullivan, G., et al., "Overview of the High Efficiency Video Coding (HEVC) Standard", vol. 22, No. 12, Dec. 2012, 20 pages.
Sjoberg, R., et al., "Overview of HEVC High-Level Syntax and Reference Picture Management", vol. 22, No. 12, Dec. 2012, 13 pages.
Document: JVET-M0123r1, Yong He, Ahmad Hamza:"AHG12: On Hierarchical Tile Design."Joint Video Experts Team. (JVET) of ITU-T SG 16 WP 3 and ISO/IEC JTC 1/SC 29/WG 11. 13th Meeting: Marrakech, MA, Jan. 9-18, 2019, total 8. Pages.

* cited by examiner

FLEXIBLE TILE SIGNALING IN VIDEO CODING

CROSS-REFERENCE TO RELATED APPLICATIONS

This is a continuation of U.S. patent application Ser. No. 18/178,196 filed on Mar. 3, 2024, which is a continuation of U.S. patent application Ser. No. 17/357,730 filed on Jun. 24, 2021, now U.S. Pat. No. 11,616,961, which is a continuation of International Application No. PCT/US2019/068790 filed on Dec. 27, 2019, which claims the benefit of U.S. Provisional Patent Application No. 62/785,511 filed Dec. 27, 2018, all of which are hereby incorporated by reference.

TECHNICAL FIELD

The present disclosure is generally related to video coding, and is specifically related to a flexible video tiling scheme that supports multiple tiles with different resolutions in the same picture.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in an encoder, the method comprising: partitioning, by a processor of the encoder, a picture into a plurality of first level tiles; partitioning, by the processor, a subset of the first level tiles into a plurality of second level tiles; encoding, by the processor, the first level tiles and the second level tiles into a bitstream; encoding, by the processor, a split indication into the bitstream, the split indication indicating that at least one of the first level tiles is split into the second level tiles; and storing, in a memory of the encoder, the bitstream for communication toward a decoder. Video coding systems may employ slices and tiles to partition pictures. Certain streaming applications (e.g., virtual reality (VR) and teleconferencing) may be improved if a single image can be sent containing multiple regions encoded at different resolutions. Some slicing and tiling mechanisms may not support such functionality because tiles at different resolutions may be treated differently. For example, a tile at a first resolution may contain a single slice of data while a tile at a second resolution may carry multiple slices of data due to differences in pixel density. The present aspects employ signaling to support the usage of a flexible tiling scheme that includes first level tiles and second level tiles. Second level tiles are created by partitioning first level tiles. This flexible tiling scheme allows a first level tile to contain one slice of data at a first resolution and a first level tile containing second level tiles to contain a plurality of slices at a second resolution. The signaling indicates when a first level tile has been further split into a second level tile. Hence, the disclosed flexible tiling scheme allows an encoder/decoder (codec) to support a picture containing multiple resolutions, and hence increases the functionality of both the encoder and decoder.

Optionally, in any of the preceding aspects, another implementation of the aspect provides, wherein the first level tiles outside the subset contain picture data at a first resolution and second level tiles contain picture data at a second resolution different from the first resolution.

Optionally, in any of the preceding aspects, another implementation of the aspect provides, wherein the split indication is encoded in a picture parameter set as a level two tile split flag, and wherein the level two tile split flag is set for each of the first level tiles that are partitioned to create the second level tiles.

Optionally, in any of the preceding aspects, another implementation of the aspect provides, wherein each second level tile contains a single slice of picture data from the picture.

Optionally, in any of the preceding aspects, another implementation of the aspect provides, further comprising encoding, by the processor, second level tile rows and second level tile columns for partitioned first level tiles, wherein the second level tile rows and the second level tile columns are encoded in a picture parameter set associated with the picture.

Optionally, in any of the preceding aspects, another implementation of the aspect provides, wherein data explicitly indicating whether a first level tile is partitioned into second level tiles is omitted from the bitstream for first level tiles with a width that is less than a minimum width threshold and a height is less than a minimum height threshold.

Optionally, in any of the preceding aspects, another implementation of the aspect provides, further comprising assigning, by the processor, the first level tiles and the second level tiles into one or more tile groups such that tiles in a corresponding tile group containing second level tiles are constrained to cover a rectangular portion of the picture.

Optionally, in any of the preceding aspects, another implementation of the aspect provides, wherein second level tile rows and second level tile columns are omitted from a picture parameter set for partitioned first level tiles with a width that is less than twice the minimum width threshold and a height is less than twice the minimum height threshold.

In an embodiment, the disclosure includes a method implemented in a decoder, the method comprising: receiving, by a processor of the decoder via a receiver, a bitstream including a picture partitioned into a plurality of first level tiles, wherein a subset of the first level tiles is further partitioned into a plurality of second level tiles; obtaining, by the processor, a split indication from the bitstream, the split indication indicating that at least one of the first level tiles is split into the second level tiles; determining, by the processor, a configuration of the first level tiles and a configuration of the second level tiles based on the split indication; decoding, by the processor, the first level tiles and the second level tiles based on the configuration of the first level tiles and the configuration of the second level tiles; and generating, by the processor, a reconstructed video sequence for display based on the decoded first level tiles and the second level tiles. Video coding systems may employ slices and tiles to partition pictures. Certain streaming applications (e.g., VR and teleconferencing) may be improved if a single image can be sent containing multiple regions encoded at different resolutions. Some slicing and tiling mechanisms may not support such functionality because tiles at different resolutions may be treated differently. For example, a tile at a first resolution may contain a single slice of data while a tile at a second resolution may carry multiple slices of data due to differences in pixel density. The present aspects employ signaling to support the usage of a flexible tiling scheme that includes first level tiles and second level tiles. Second level tiles are created by partitioning first level tiles. This flexible tiling scheme allows a first level tile to contain one slice of data at a first resolution and a first level tile containing second level tiles to contain a plurality of slices at a second resolution. The signaling indicates when a first level tile has been further split into a second level tile. Hence, the disclosed flexible tiling scheme allows an codec to support a picture containing multiple resolutions, and hence increases the functionality of both the encoder and decoder.

Optionally, in any of the preceding aspects, another implementation of the aspect provides, wherein the first level tiles outside the subset contain picture data at a first resolution and second level tiles contain picture data at a second resolution different from the first resolution.

Optionally, in any of the preceding aspects, another implementation of the aspect provides, wherein the split indication is obtained from a picture parameter set in a level two tile split flag, and wherein the level two tile split flag is set for each of the first level tiles that are partitioned to create the second level tiles.

Optionally, in any of the preceding aspects, another implementation of the aspect provides, wherein each second level tile contains a single slice of picture data from the picture.

Optionally, in any of the preceding aspects, another implementation of the aspect provides, further comprising obtaining, by the processor, second level tile rows and second level tile columns from the bitstream for partitioned first level tiles, wherein the second level tile rows and the second level tile columns are obtained from a picture parameter set associated with the picture, and wherein the configuration of the first level tiles and the configuration of the second level tiles are determined based on the second level tile rows and the second level tile columns.

Optionally, in any of the preceding aspects, another implementation of the aspect provides, wherein data explicitly indicating whether a first level tile is partitioned into second level tiles is omitted from the bitstream for first level tiles with a width that is less than a minimum width threshold and a height is less than a minimum height threshold.

Optionally, in any of the preceding aspects, another implementation of the aspect provides, wherein the first level tiles and the second level tiles are assigned into one or more tile groups such that tiles in a corresponding tile group containing second level tiles are constrained to cover a rectangular portion of the picture.

Optionally, in any of the preceding aspects, another implementation of the aspect provides, wherein second level tile rows and second level tile columns are omitted from a picture parameter set for partitioned first level tiles with a width that is less than twice the minimum width threshold and a height is less than twice the minimum height threshold.

In an embodiment, the disclosure includes a video coding device comprising: a processor, a receiver coupled to the processor, and a transmitter coupled to the processor, the processor, receiver, and transmitter configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes an encoder comprising: a partitioning means for: partitioning a picture into a plurality of first level tiles; and partitioning a subset of the first level tiles into a plurality of second level tiles; an encoding means for: encoding the first level tiles and the second level tiles into a bitstream; and encoding a split indication into the bitstream, the split indication indicating that at least one of the first level tiles is split into the second level tiles; and a storing means for storing the bitstream for communication toward a decoder.

Optionally, in any of the preceding aspects, another implementation of the aspect provides, wherein the encoder is further configured to perform the method of any of the preceding aspects.

In an embodiment, the disclosure includes a decoder comprising: a receiving means for receiving a bitstream including a picture partitioned into a plurality of first level tiles, wherein a subset of the first level tiles are further partitioned into a plurality of second level tiles; an obtaining means for obtaining a split indication from the bitstream, the split indication indicating that at least one of the first level tiles is split into the second level tiles; a determining means for determining a configuration of the first level tiles and a configuration of the second level tiles based on the split indication; a decoding means for decoding the first level tiles and the second level tiles based on the configuration of the first level tiles and the configuration of the second level tiles; and a generating means for generating a reconstructed video sequence for display based on the decoded first level tiles and the second level tiles.

Optionally, in any of the preceding aspects, another implementation of the aspect provides, wherein the decoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
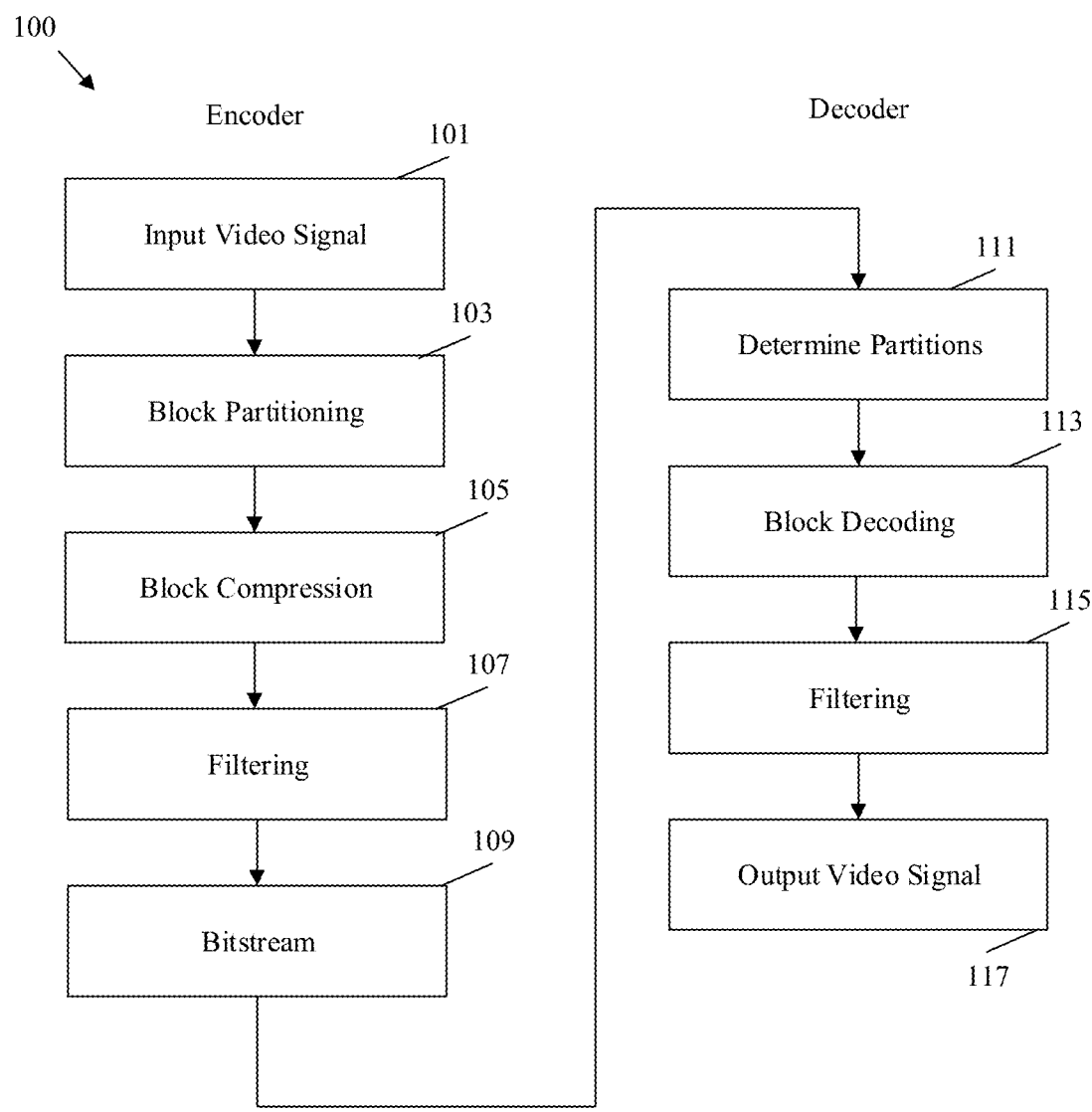
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Various acronyms are employed herein, such as coding tree block (CTB), coding tree unit (CTU), coding unit (CU), coded video sequence (CVS), Joint Video Experts Team (JVET), motion constrained tile set (MCTS), maximum transfer unit (MTU), network abstraction layer (NAL), picture order count (POC), raw byte sequence payload (RBSP), sequence parameter set (SPS), versatile video coding (VVC), and working draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-L1001-v5.

In order to code a video image, the image is first partitioned, and the partitions are coded into a bitstream. Various picture partitioning schemes are available. For example, an image can be partitioned into regular slices, dependent slices, tiles, and/or according to Wavefront Parallel Processing (WPP). For simplicity, HEVC restricts encoders so that only regular slices, dependent slices, tiles, WPP, and combinations thereof can be used when partitioning a slice into groups of CTBs for video coding. Such partitioning can be applied to support Maximum Transfer Unit (MTU) size matching, parallel processing, and reduced end-to-end delay. MTU denotes the maximum amount of data that can be transmitted in a single packet. If a packet payload is in excess of the MTU, that payload is split into two packets through a process called fragmentation.

A regular slice, also referred to simply as a slice, is a partitioned portion of an image that can be reconstructed independently from other regular slices within the same picture, notwithstanding some interdependencies due to loop filtering operations. Each regular slice is encapsulated in its own Network Abstraction Layer (NAL) unit for transmission. Further, in-picture prediction (intra sample prediction, motion information prediction, coding mode prediction) and entropy coding dependency across slice boundaries may be disabled to support independent reconstruction. Such independent reconstruction supports parallelization. For example, regular slice based parallelization employs minimal inter-processor or inter-core communication. However, as each regular slice is independent, each slice is associated with a separate slice header. The use of regular slices can incur a substantial coding overhead due to the bit cost of the slice header for each slice and due to the lack of prediction across the slice boundaries. Further, regular slices may be employed to support matching for MTU size requirements. Specifically, as a regular slice is encapsulated in a separate NAL unit and can be independently coded, each regular slice should be smaller than the MTU in MTU schemes to avoid breaking the slice into multiple packets. As such, the goal of parallelization and the goal of MTU size matching may place contradicting demands to a slice layout in a picture.

Dependent slices are similar to regular slices, but have shortened slice headers and allow partitioning of the image treeblock boundaries without breaking in-picture prediction. Accordingly, dependent slices allow a regular slice to be fragmented into multiple NAL units, which provides reduced end-to-end delay by allowing a part of a regular slice to be sent out before the encoding of the entire regular slice is complete.

A tile is a partitioned portion of an image created by horizontal and vertical boundaries that create columns and rows of tiles. Tiles may be coded in raster scan order (right to left and top to bottom). The scan order of CTBs is local within a tile. Accordingly, CTBs in a first tile are coded in raster scan order, before proceeding to the CTBs in the next tile. Similar to regular slices, tiles break in-picture prediction dependencies as well as entropy decoding dependencies. However, tiles may not be included into individual NAL units, and hence tiles may not be used for MTU size matching. Each tile can be processed by one processor/core, and the inter-processor/inter-core communication employed for in-picture prediction between processing units decoding neighboring tiles may be limited to conveying a shared slice header (when adjacent tiles are in the same slice), and performing loop filtering related sharing of reconstructed samples and metadata. When more than one tile is included in a slice, the entry point byte offset for each tile other than the first entry point offset in the slice may be signaled in the slice header. For each slice and tile, at least one of the following conditions should be fulfilled: 1) all coded treeblocks in a slice belong to the same tile; and 2) all coded treeblocks in a tile belong to the same slice.

In WPP, the image is partitioned into single rows of CTBs. Entropy decoding and prediction mechanisms may use data from CTBs in other rows. Parallel processing is made possible through parallel decoding of CTB rows. For example, a current row may be decoded in parallel with a preceding row. However, decoding of the current row is delayed from the decoding process of the preceding rows by two CTBs. This delay ensures that data related to the CTB above and the CTB above and to the right of the current CTB in the current row is available before the current CTB is coded. This approach appears as a wavefront when represented graphically. This staggered start allows for parallelization with up to as many processors/cores as the image contains CTB rows. Because in-picture prediction between neighboring treeblock rows within a picture is permitted, the inter-processor/inter-core communication to enable in-picture prediction can be substantial. The WPP partitioning does consider NAL unit sizes. Hence, WPP does not support MTU size matching. However, regular slices can be used in conjunction with WPP, with certain coding overhead, to implement MTU size matching as desired.

Tiles may also include motion constrained tile sets. A motion constrained tile set (MCTS) is a tile set designed such that associated motion vectors are restricted to point to full-sample locations inside the MCTS and to fractional-sample locations that require only full-sample locations inside the MCTS for interpolation. Further, the usage of motion vector candidates for temporal motion vector prediction derived from blocks outside the MCTS is disallowed. This way, each MCTS may be independently decoded without the existence of tiles not included in the MCTS. Temporal MCTSs supplemental enhancement information (SEI) messages may be used to indicate the existence of MCTSs in the bitstream and signal the MCTSs. The MCTSs SEI message provides supplemental information that can be used in the MCTS sub-bitstream extraction (specified as part of the semantics of the SEI message) to generate a conforming bitstream for a MCTS. The information includes a number of extraction information sets, each defining a number of MCTSs and containing raw bytes sequence payload (RBSP) bytes of the replacement video parameter sets (VPSs), sequence parameter sets (SPSs), and picture parameter sets (PPSs) to be used during the MCTS sub-bitstream extraction process. When extracting a sub-bitstream according to the MCTS sub-bitstream extraction process, parameter sets (VPSs, SPSs, and PPSs) may be rewritten or replaced, and slice headers may be updated because one or all of the slice address related syntax elements (including first_slice_segment_in_pic_flag and slice_segment_address) may employ different values in the extracted sub-bitstream.

The various tiling schemes may be employed when partitioning a picture for further encoding. As a particular example, tiles can be assigned to tile groups, which can take the place of slices in some examples. In some examples, each tile group can be extracted independently of other tile groups. Accordingly, tile grouping may support parallelization by allowing each tile group to be assigned to a different processor. Tile grouping can also be employed in cases where a decoder may not wish to decode an entire image. As a particular example, video coding schemes may be employed to support virtual reality (VR) video, which may be encoded according to Omnidirectional Media Application Format (OMAF).

In VR video, one or more cameras may record the environment around the camera(s). A user can then view the VR video as if the user were present in the same location as the camera. In VR video, a picture encompasses an entire environment around the user. The user then views a sub-portion of the picture. For example, a user may employ a head mounted display that changes the sub-portion of the picture displayed based on the head movements of the user. The portion of the video being displayed may be referred to as a viewport.

Accordingly, a distinct feature of omnidirectional video is that only a viewport is displayed at any particular time. This is in contrast to other video applications that may display an entire video. This feature may be utilized to improve the performance of omnidirectional video systems, for example through selective delivery depending on the user's viewport (or any other criteria, such as recommended viewport timed metadata). Viewport-dependent delivery may be enabled, for example, by employing region-wise packing and/or viewport-dependent video coding. The performance improvement may result in lower transmission bandwidth, lower decoding complexity, or both when compared to other omnidirectional video systems when employing the same video resolution/quality.

An example viewport-dependent operation is an MCTS-based approach for achieving five thousand sample (e.g., 5120×2560 luma samples) resolution (5K) effective equirectangle projection (ERP) resolution with HEVC-based viewport-dependent OMAF video profile. This approach is described in greater detail below. But generally, this approach partitions VR video into tile groups and encodes the video at a plurality of resolutions. The decoder can indicate the viewport currently used by the user during streaming. The video server providing the VR video data can then forward the tile group(s) associated with the viewport at high resolution and forward non-viewed tile groups at lower resolution. This allows the user to view the VR video at a high resolution without requiring the entire picture be sent at high resolution. The non-viewed sub-portions are discarded, and hence the user may be unaware of the lower resolutions. However, the lower resolution tile groups may be displayed to the user if the user changes viewports. The resolution of the new viewport may then be increased as the video proceeds. In order to implement such a system, pictures should be created that contain both the higher resolution tile groups and the lower resolution tile groups.

In another example, video conferencing applications may be designed to forward pictures including multiple resolutions. For example, a video conference may contain multiple participants. The participant currently speaking may be displayed at a higher resolution and other participants may be displayed at lower resolutions. In order to implement such a system, pictures should be created that contain both the higher resolution tile groups and the lower resolution tile groups.

Disclosed herein are various flexible tiling mechanisms to support creating a picture with sub-pictures coded at multiple resolutions. For example, a video can be coded at a plurality of resolutions. The video can also be coded by employing slices at each resolution. The lower resolution slices are smaller than the higher resolution slices. In order to create a picture with multiple resolutions, the picture can be partitioned into first level tiles. The slices from the highest resolution can be included directly into the first level tiles. Further, the first level tiles can be partitioned into second level tiles that are smaller than the first level tiles. Accordingly, the smaller second level tiles can directly accept the lower resolution slices. In this way, the slices from each resolution can be compressed into a single picture via a tile index relationship without requiring that different resolution tiles be dynamically readdressed to use a consistent addressing scheme. The first level tiles and second level tiles may be implemented as MCTSs, and hence may accept motion constrained image data at different resolutions. The present disclosure includes many aspects. As a particular example, the first level tiles are split into second level tiles. The second level tiles are then constrained to each contain a single rectangular slice of picture data (e.g., at the smaller resolution). As used herein, a tile is a partitioned portion of a picture created by horizontal and vertical boundaries (e.g., according to columns and rows). A rectangular slice is a slice constrained to maintain a rectangular shape, and is hence coded based on horizontal and vertical picture boundaries. Accordingly, a rectangular slice is not coded based on a raster scan group (which contains CTUs in a line from left to right and top to bottom and may not maintain a rectangular shape). A slice is a spatially distinct region of a picture/frame that is encoded separately from any other region in the same frame/picture. As another particular example, a configuration of the first level tiles and second level tiles can be signaled, for example in a parameter set. For example, a split indication, such as a flag, can be set for each first level tile. The split indication can be set to a first value to indicate the corresponding first level tile is not split into second level tiles or set to a second value to indicate the corresponding first level tile is split into second level tiles.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
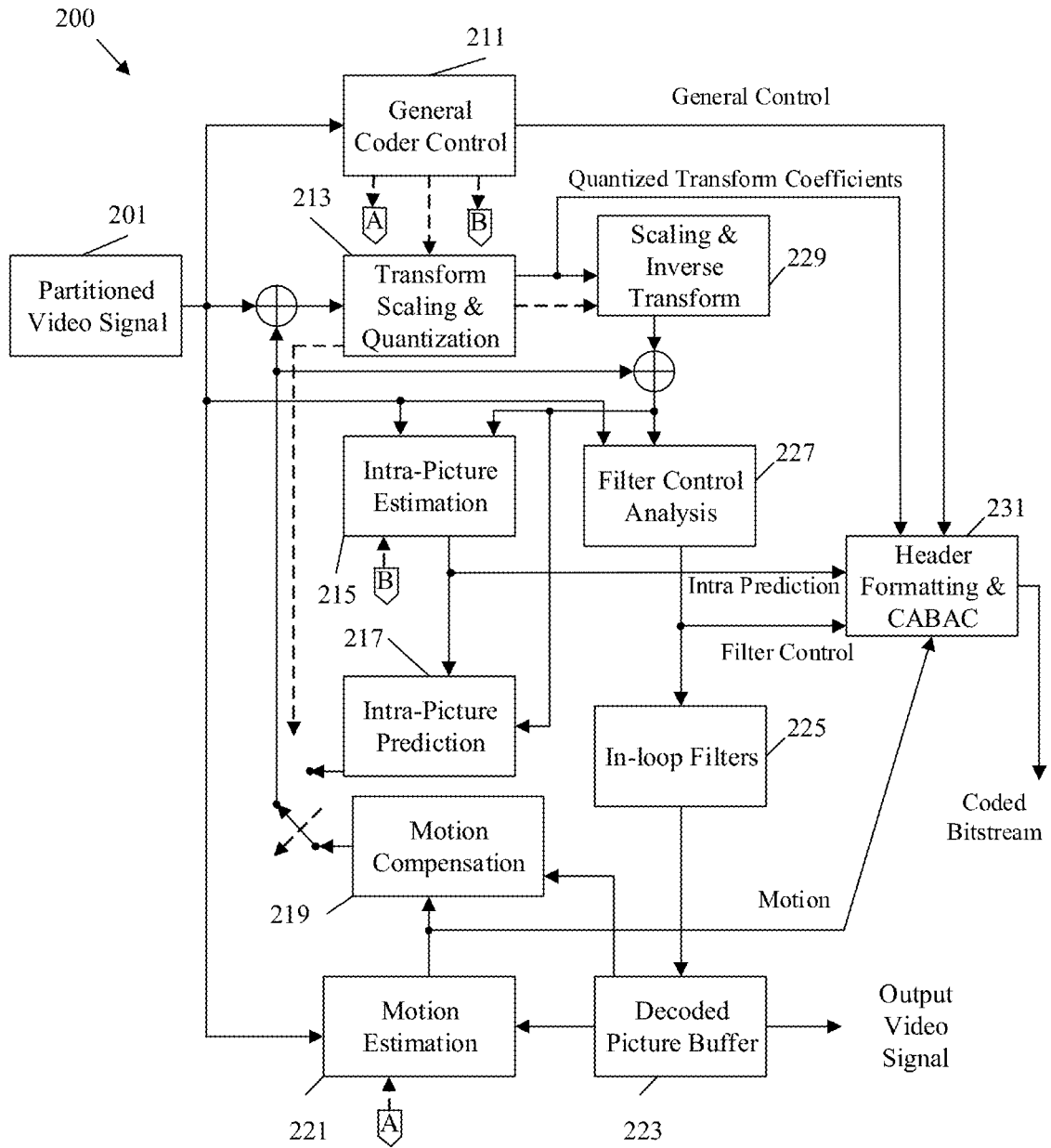
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
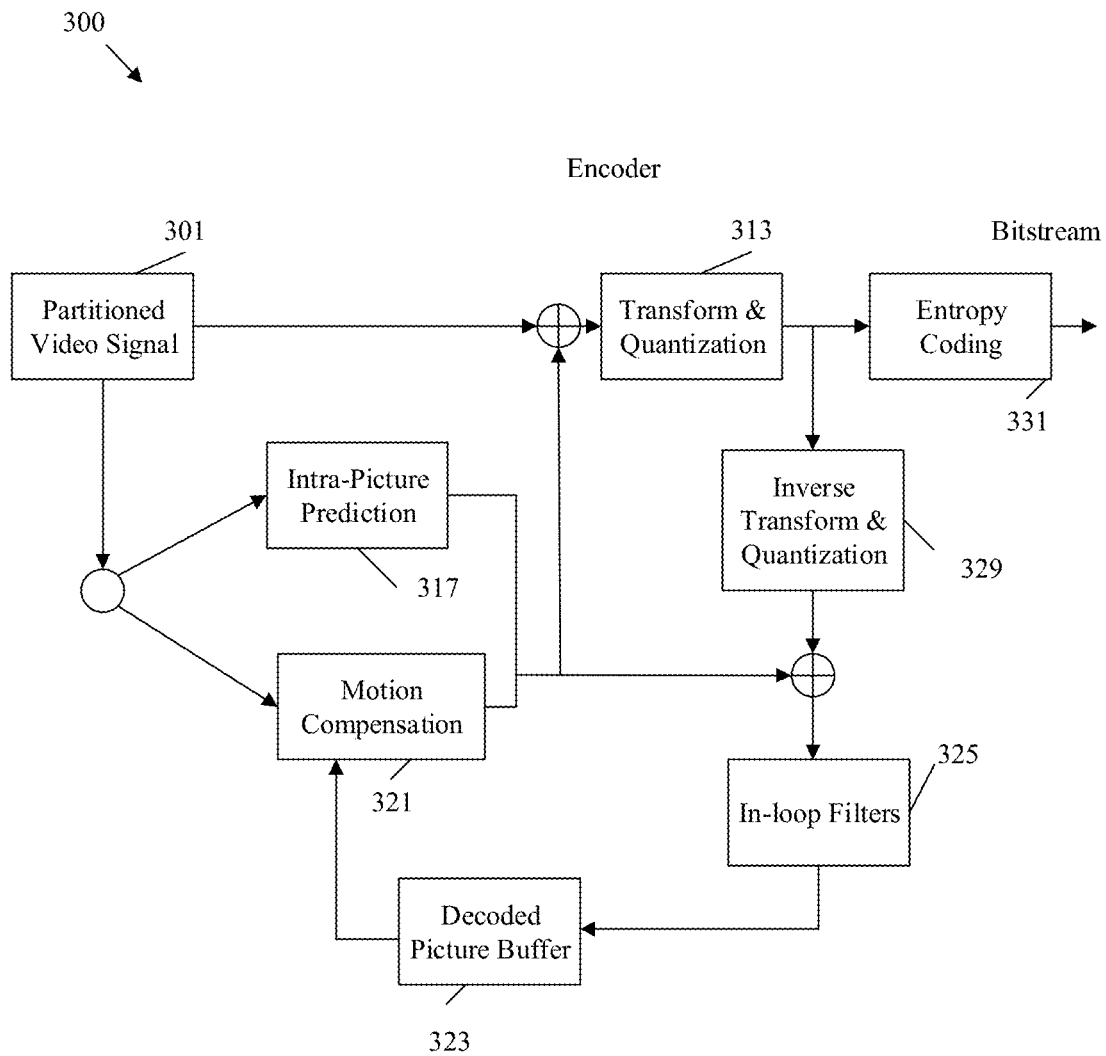
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
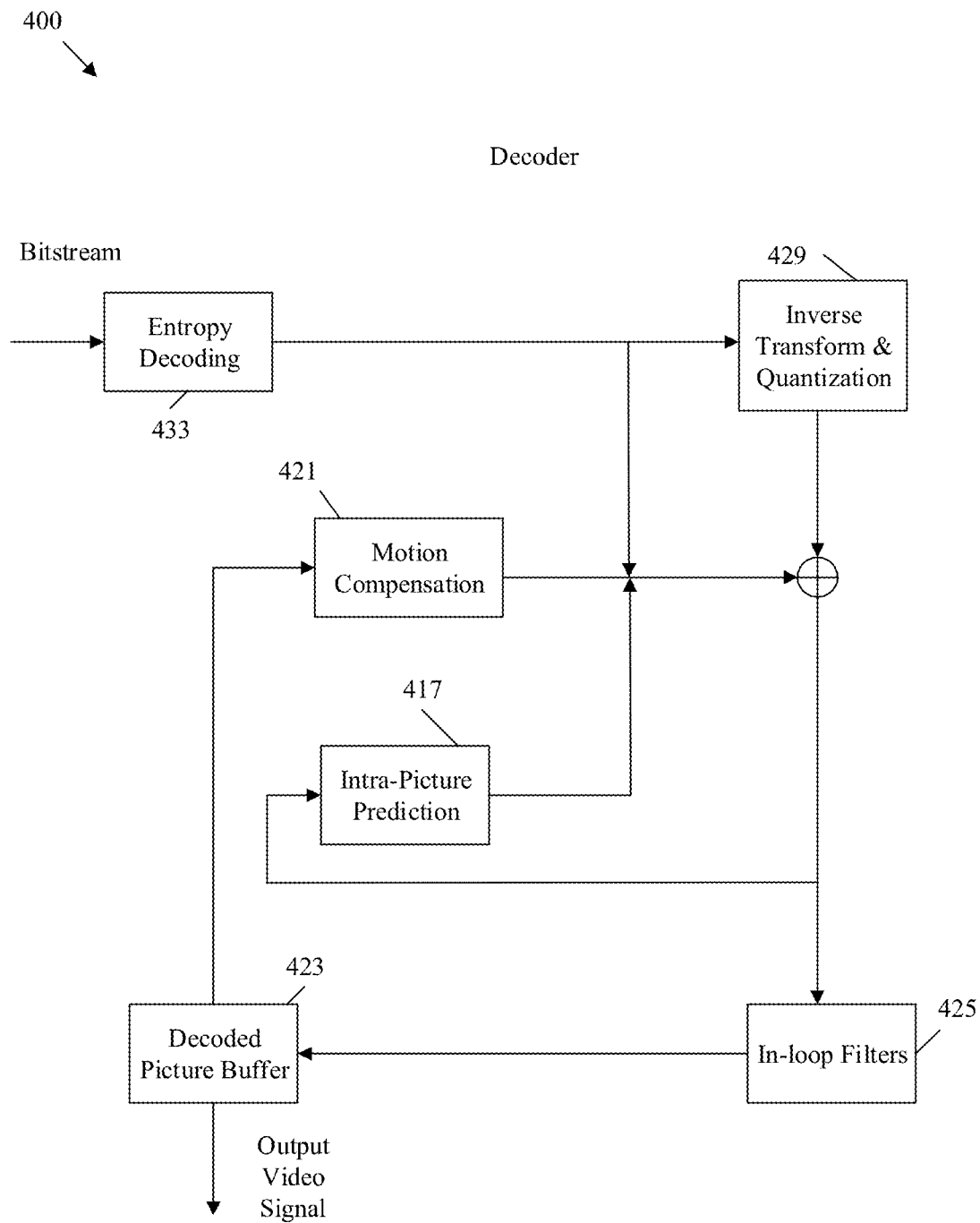
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
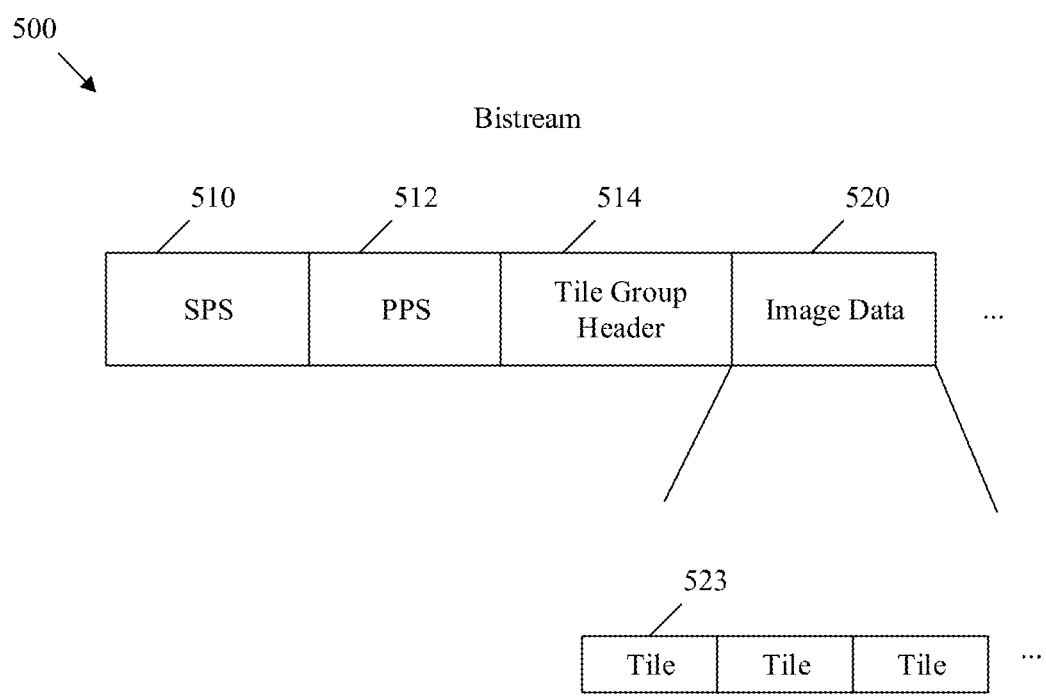
FIG. 5 is a schematic diagram illustrating an example bitstream containing an encoded video sequence.

FIG. 5 is a schematic diagram illustrating an example bitstream 500 containing an encoded video sequence. For example, the bitstream 500 can be generated by a codec system 200 and/or an encoder 300 for decoding by a codec system 200 and/or a decoder 400. As another example, the bitstream 500 may be generated by an encoder at step 109 of method 100 for use by a decoder at step 111.

The bitstream 500 includes a sequence parameter set (SPS) 510, a plurality of picture parameter sets (PPSs) 512, tile group headers 514, and image data 520. An SPS 510 contains sequence data common to all the pictures in the video sequence contained in the bitstream 500. Such data can include picture sizing, bit depth, coding tool parameters, bit rate restrictions, etc. The PPS 512 contains parameters that are specific to one or more corresponding pictures. Hence, each picture in a video sequence may refer to one PPS 512. The PPS 512 can indicate coding tools available for tiles in corresponding pictures, quantization parameters, offsets, picture specific coding tool parameters (e.g., filter controls), etc. The tile group header 514 contains parameters that are specific to each tile group in a picture. Hence, there may be one tile group header 514 per tile group in the video sequence. The tile group header 514 may contain tile group information, picture order counts (POCs), reference picture lists, prediction weights, tile entry points, deblocking parameters, etc. It should be noted that some systems refer to the tile group header 514 as a slice header, and use such information to support slices instead of tile groups.

The image data 520 contains video data encoded according to inter-prediction and/or intra-prediction as well as corresponding transformed and quantized residual data. Such image data 520 is sorted according to the partitioning used to partition the image prior to encoding. For example, the image in the image data 520 is divided into tiles 523. The tiles 523 are further divided into coding tree units (CTUs). The CTUs are further divided into coding blocks based on coding trees. The coding blocks can then be encoded/decoded according to prediction mechanisms. An image/picture can contain one or more tiles 523.

A tile 523 is a partitioned portion of a picture created by horizontal and vertical boundaries. Tiles 523 may be rectangular and/or square. Specifically, a tile 523 includes four sides that are connected at right angles. The four sides include two pair of parallel sides. Further, the sides in a parallel side pair are of equal length. As such, a tile 523 may be any rectangular shape, where a square is a special case of a rectangle where all four sides are of equal length. A picture may be petitioned into rows and columns of tiles 523. A tile row is a set of tiles 523 positioned in a horizontally adjacent manner to create a continuous line from the left boundary to the right boundary of a picture (or vice versa). A tile column is a set of tiles 523 positioned in a vertically adjacent manner to create a continuous line from the top boundary to the bottom boundary of the picture (or vice versa). Tiles 523 may or may not allow prediction based on other tiles 523, depending on the example. Each tile 523 may have a unique tile index in the picture. A tile index is a procedurally selected numerical identifier that can be used to distinguish one tile 523 from another. For example, tile indices may increase numerically in raster scan order. Raster scan order is left to right and top to bottom. It should be noted that, in some examples, tiles 523 may also be assigned tile identifiers (IDs). A tile ID is an assigned identifier that can be used to distinguish one tile 523 from another. Computations may employ tile IDs instead of tile indices in some examples. Further, tile IDs can be assigned to have the same values as the tile indices in some examples. Tile indices and/or IDs may be signaled to indicate tile groups containing the tiles 523. For example, the tile indices and/or IDs may be employed to map picture data associated with a tile 523 to a proper position for display. A tile group is a related set of tiles 523 that can be separately extracted and coded, for example to support display of a region of interest and/or to support parallel processing. Tiles 523 in a tile group can be coded without reference to tiles 523 outside of the tile group. Each tile 523 may be assigned to a corresponding tile group, and therefore a picture can contain a plurality of tile groups.

FIGS. 6A-6E illustrate an example mechanism 600 for creating an extractor track 610 for combining sub-pictures of multiple resolutions from different bitstreams into a single picture for use in virtual reality (VR) applications. Mechanism 600 may be employed to support an example use case of method 100. For example, mechanism 600 can be employed to generate a bitstream 500 for transmission from a codec system 200 and/or an encoder 300 toward a codec system 200 and/or a decoder 400. As a specific example, mechanism 600 can be employed for use in conjunction with VR, OMAF, three hundred sixty degree video, etc.

In VR, only a portion of video is displayed to a user. For example, VR video may be filmed to include a sphere surrounding a user. The user may employ a head mounted display (HMD) to view the VR video. The user may point the HMD toward a region of interest. The region of interest is displayed to the user and other video data is discarded. In this way, a user views only a user selected portion of the VR video at any instant. This approach mimics the user's perceptions, and hence causes the user to experience a virtual environment in a manner that mimics a real environment. One of the issues with this approach is that the entire VR video may be transmitted to the user, but only a current viewport of the video is actually used and the remainder is discarded. In order to increase signaling efficiency for streaming applications, the user's current viewport can be transmitted at a higher first resolution and other viewports can be transmitted at a lower second resolution. In this way, the viewports that are likely to be discarded take up less bandwidth than the viewport(s) likely to be viewed by the user. In the event the user selects a new viewport, the lower resolution content can be shown until the decoder can request that a different current viewport be transmitted at the higher first resolution. Mechanism 600 can be employed to create an extractor track 610, as shown in FIG. 6E, to support this functionality. An extractor track 610 is a track of image data that encapsulates a picture at multiple resolutions for use as described above.

Figure 6A:
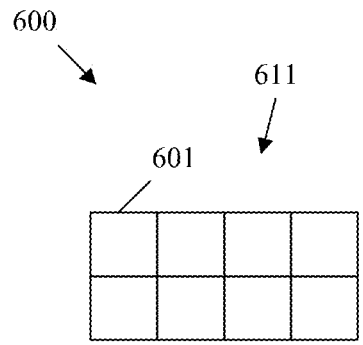
FIGS. 6A-6E illustrate an example mechanism for creating an extractor track for combining sub-pictures of multiple resolutions from different bitstreams into a single picture for use in virtual reality (VR) applications.
Figure 6C:
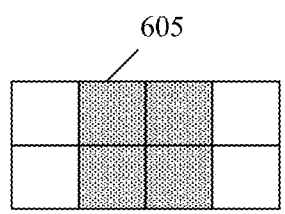
Figure 6E:
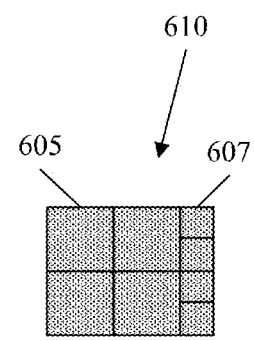
Figure 6B:
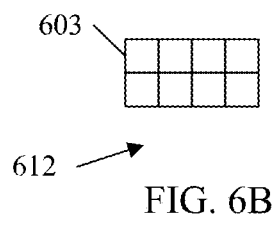

The mechanism 600 encodes the same video content at a first resolution 611 and a second resolution 612, as shown in FIGS. 6A and 6B, respectively. As a specific example, the first resolution 611 may be 5120×2560 luma samples and the second resolution 612 may be 2560×1280 luma samples. The pictures of the video may be partitioned into tiles 601 at the first resolution 611 and tiles 603 at the second resolution 612, respectively. In the example shown, the tiles 601 and 603 are each partitioned into a 4×2 grid. Further, an MCTS can be coded for each tile 601 and 603 position. The pictures at the first resolution 611 and the second resolution 612 each results in an MCTS sequence describing video over time at a corresponding resolution. Each coded MCTS sequence is stored as a sub-picture track or a tile track. Mechanism 600 can then use the pictures to create segments to support viewport adaptive MCTS selection. For example, each range of viewing orientations that causes a different selection of high- and low-resolution MCTSs is considered. In the illustrated example, four tiles 601 containing MCTSs at the first resolution 611 and four tiles 603 containing MCTSs at the second resolution 613 are obtained.

Figure 6D:
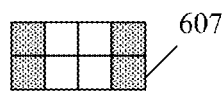

Mechanism 600 can then create an extractor track 610 for each possible viewport-adaptive MCTS selection. FIGS. 6C and 6D illustrate an example viewport-adaptive MCTS selection. Specifically, a set of selected tiles 605 and 607 are selected at the first resolution 611 and the second resolution 612, respectively. The selected tiles 605 and 607 are illustrated in gray shading. In the example shown, the selected tiles 605 are the tiles 601 at the first resolution 611 that are to be shown to the user and the selected tiles 607 are the tiles 603 at the second resolution 612 that are likely to be discarded but maintained to support display in the event the user selects a new viewport. The selected tiles 605 and 607 are then combined into a single picture containing image data at both the first resolution 611 and the second resolution 612. Such pictures are combined to create an extractor track 610. FIG. 6E illustrates a single picture from a corresponding extractor track 610 for purpose of illustration. As shown, the picture in the extractor track 610 contains the selected tiles 605 and 607 from the first resolution 611 and second resolution 612. As noted above, FIGS. 6C-6E illustrate a single viewport-adaptive MCTS selection. In order to allow for user selection of any viewport, an extractor track 610 should be created for each possible combination of selected tiles 605 and 607.

In the example shown, each selection of tiles 603 encapsulating content from the second resolution 612 bitstream contains two slices. A RegionWisePackingBox may be included in the extractor track 610 to create a mapping between the packed picture and a projected picture of the ERP format. In the presented example, the bitstreams resolved from the extractor tracks have resolution 3200× 2560. Consequently, a four thousand sample (4K)-capable decoder may decode content where the viewport is extracted from a coded bitstream with five thousand sample 5K (5120×2560) resolution.

As shown, the extractor track 610 contains two rows of high resolution tiles 601 and four rows of low resolution tiles 603. Accordingly, the extractor track 610 contains two slices of high resolution content and four slices of low resolution content. Uniform tiling is may not support such a use case. Uniform tiling is defined by a set of tile columns and a set of tile rows. Tile columns extend from the top of a picture to the bottom of the picture. Likewise, tile rows extend from the left of the picture to the right of the picture. While such structure can be simply defined, this structure cannot effectively support advance use cases such as the use case described by mechanism 600. In the example shown, different numbers of rows are employed at different sections of the extractor track 610. If uniform tiling is employed, the tiles at the right side of the extractor track 610 should be rewritten to accept two slices each. This approach is inefficient and computationally complex.

The present disclosure includes a flexible tiling scheme, as described below, that does not require tiles be rewritten to include different numbers of slices. The flexible tiling scheme allows a tile 601 to contain content at a first resolution 611. The flexible tiling scheme also allows a tile 601 to be partitioned into smaller tiles that can each be directly mapped to tiles 603 at a second resolution 612. This direct mapping is more efficient as such an approach does not require that the tiles be rewritten/readdressed when different resolutions are combined as described above.

Figure 7:
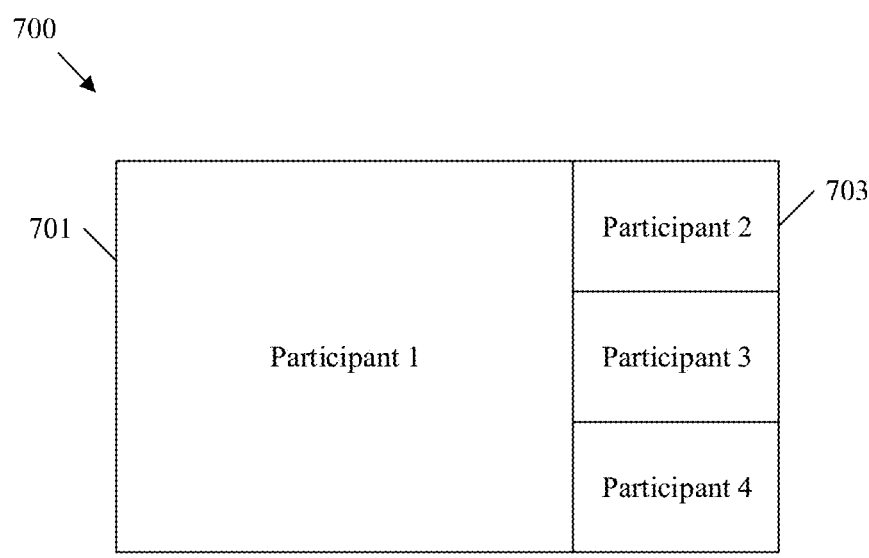
FIG. 7 illustrates an example video conferencing application that splices pictures of multiple resolutions from different bitstreams into a single picture for display.

FIG. 7 illustrates an example video conferencing application 700 that splices pictures of multiple resolutions from different bitstreams into a single picture for display. Application 700 may be employed to support an example use case of method 100. For example, application 700 can be employed at a codec system 200 and/or a decoder 400 to display video content from bitstream 500 from a codec system 200 and/or an encoder 300. The video conferencing application 700 displays a video sequence to a user. The video sequence contains pictures displaying a speaking participant 701 and other participants 703. The speaking participant 701 is displayed at a higher first resolution and the other participants 703 are displayed at a smaller second resolution. In order to code such a picture, the picture should contain a portion with a single row and a portion with three rows. To support such a scenario with uniform tiling, the picture is partitioned into a left and a right tile. The right tile is then rewritten/readdressed to include three rows. Such readdressing results in both a compression and a performance penalty. The flexible tiling scheme described below allows a single tile to be partitioned into smaller tiles and mapped to tiles in sub-picture bitstreams associated with the other participants 703. In this way, the speaking participant 701 can be directly mapped into a first level tile and the other participants 703 can be mapped to second level tiles split from the first tile without such rewriting/readdressing.

Figure 8A:
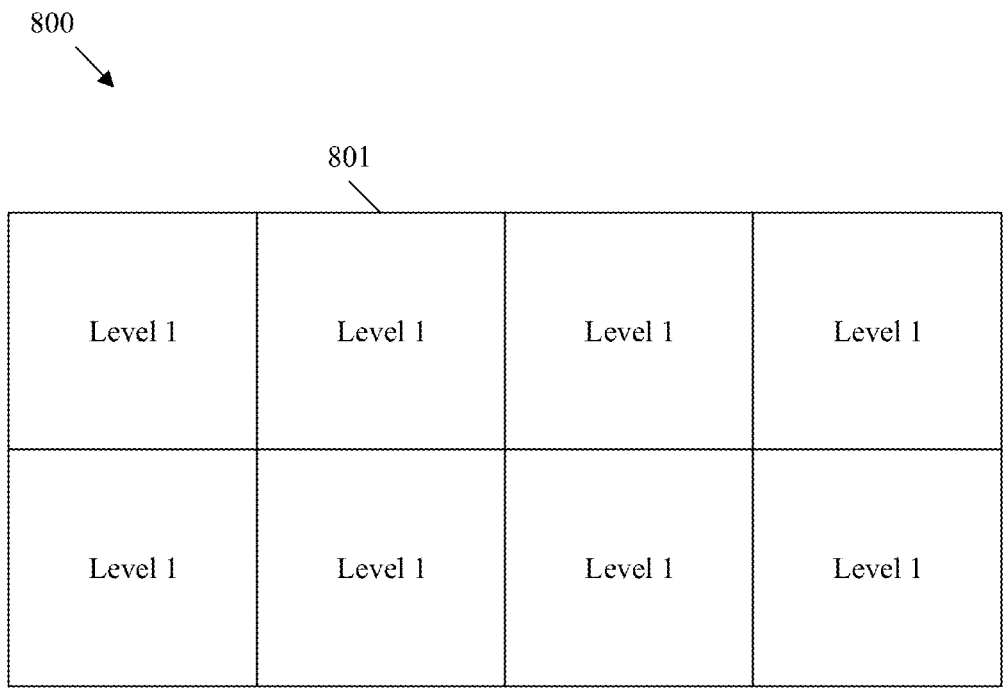
FIGS. 8A-8B are schematic diagrams illustrating an example flexible video tiling scheme capable of supporting multiple tiles with different resolutions in the same picture.
Figure 8B:
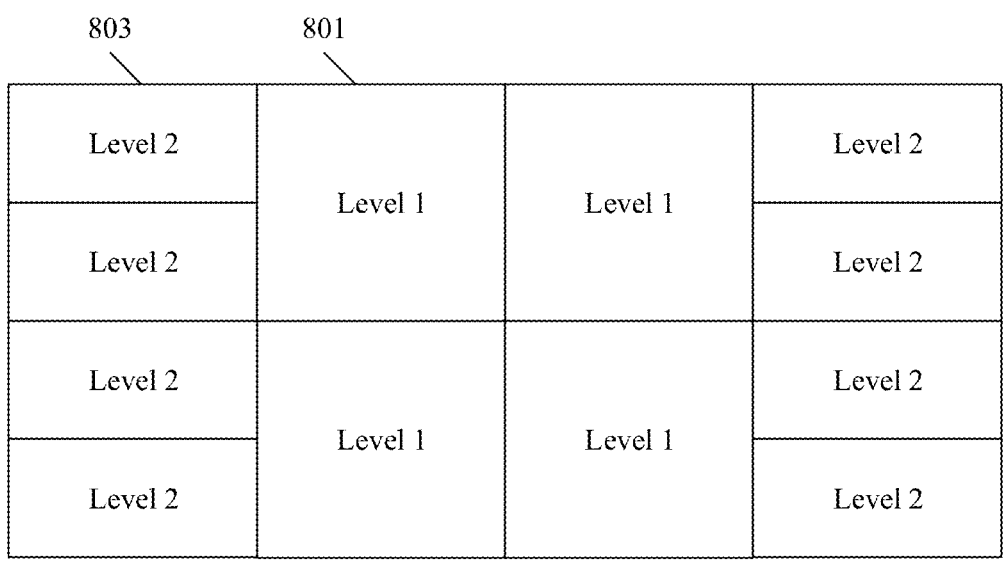

FIGS. 8A-8B are schematic diagrams illustrating an example flexible video tiling scheme 800 capable of supporting multiple tiles with different resolutions in the same picture. The flexible video tiling scheme 800 can be employed to support a more efficient coding mechanism 600 and application 700. Accordingly, the flexible video tiling scheme 800 can be employed as part of method 100. Further, the flexible video tiling scheme 800 can be employed by a codec system 200, an encoder 300, and/or a decoder 400. The results of the flexible video tiling scheme 800 can be stored in a bitstream 500 for transmission between the encoder and the decoder.

As shown in FIG. 8A, picture (e.g., frame, image, etc.) can be partitioned into first level tiles 801, also known as level one tiles. As shown in FIG. 8B, the first level tiles 801 can be selectively partitioned to create second level tiles 803, also known as level two tiles. The first level tiles 801 and second level tiles 803 can then be employed to create a picture with sub-pictures coded at multiple resolutions. A first level tile 801 is a tile generated by completely partitioning a picture into a set of columns and a set of rows. A second level tile 803 is a tile generated by partitioning a first level tile 801.

As described above, in various scenarios a video can be coded at a plurality of resolutions, for example in VR and/or teleconferencing. The video can also be coded by employing slices at each resolution. The lower resolution slices are smaller than the higher resolution slices. In order to create a picture with multiple resolutions, the picture can be partitioned into first level tiles 801. The slices from the highest resolution can be included directly into the first level tiles 801. Further, the first level tiles 801 can be partitioned into second level tiles 803 that are smaller than the first level tiles 801. Accordingly, the smaller second level tiles 803 can directly accept the lower resolution slices. In this way, the slices from each resolution can be compressed into a single picture, for example via a tile index relationship, without requiring that different resolution tiles be dynamically readdressed to use a consistent addressing scheme. The first level tiles 801 and second level tiles 803 may be implemented as MCTSs, and hence may accept motion constrained image data at different resolutions.

The present disclosure includes many aspects. As a particular example, the first level tiles 801 are split into second level tiles 803. The second level tiles 803 may then be constrained to each contain a single rectangular slice of picture data (e.g., at the smaller resolution). A rectangular slice is a slice constrained to maintain a rectangular shape, and is hence coded based on horizontal and vertical picture boundaries. Accordingly, a rectangular slice is not coded based on a raster scan group (which contains CTUs in a line from left to right and top to bottom and may not maintain a rectangular shape). A slice is a spatially distinct region of a picture/frame that is encoded separately from any other region in the same frame/picture. In another example, first level tile 801 can be split into two or more complete second level tiles 803. In such a case, a first level tile 801 may not contain a partial second level tile 803. In another example, a configuration of the first level tiles 801 and second level tiles 803 can be signaled in a parameter set in a bitstream, such as a PPS associated with a picture partitioned to create the tiles. In one example, a split indication, such as a flag, can be coded in a parameter set for each first level tile 801. The indication denotes which first level tiles 801 are further split into second level tiles 803. In another example, the configuration of second level tiles 803 can be signaled as a number of second level tile columns and a number of second level tile rows.

In another example, the first level tiles 801 and the second level tiles 803 can be assigned into tile groups. Such tile groups can be constrained so that all tiles in a corresponding tile group are constrained to cover a rectangular region of the picture (e.g., in contrast to raster scan). For example, some systems may add tiles to a tile group in raster scan order. This includes adding an initial tile in a current row, proceeding to add each tile in the row until the left picture boundary of the current row is reached, proceeding to the right boundary of the next row, and adding each tile in the next row, etc. until a final tile is reached. This approach may result in non-rectangular shapes that extend across the picture. Such shapes may not be useful for creating pictures with multiple resolutions as described herein. Instead, the present example may constrain tile groups such that any first level tile 801 and/or second level tile 803 may be added to the tile group (e.g., in any order), but the resulting tile group must be a rectangle or square (e.g., include four sides connected at right angles). This constraint may ensure that second level tiles 803 partitioned from a single first level tile 801 are not placed in different tile groups.

In another example, data explicitly indicating a number of second level tile columns and a number of second level tile rows can be omitted from a bitstream when a first level tile width is less than twice a minimum width threshold and a first level tile height is less than twice a minimum height threshold. This is because a first level tile 801 meeting such conditions may not be split into more than one column or one row, respectively, and hence such information can be inferred by the decoder. In another example, split indications indicating which first level tiles 801 are partitioned into second level tiles 803 can be omitted from the bitstream for certain first level tiles 801. For example, such data can be omitted when the first level tile 801 has a first level tile width that is less than a minimum width threshold and a first level tile height is less than a minimum height threshold. This is because a first level tile 801 meeting such conditions is too small to be split into second level tiles 803, and hence such information can be inferred by the decoder.

As described above, a flexible video tiling scheme 800 supports merging sub-pictures from different bitstreams into a picture containing multiple resolutions. The following describes various embodiments that support such functionalities. In general, this disclosure describes methods for signaling and coding of tiles in video coding that partition pictures in a manner that is more flexible that the tiling scheme in the HEVC. More specifically, this disclosure describes some tiling schemes wherein tile columns may not uniformly extend from top to bottom of a coded picture and likewise tile rows may not uniformly extend from left to right of a coded picture.

For example, based on an HEVC tiling approach, some tiles should be further split into multiple tile rows to support the functionality described in FIGS. 6A-6E and 7. Further, depending on how tiles are positioned, a tile should be further split into tile columns. For example, in FIG. 7 the participants two through four may positioned below participant one in some cases, which could be supported by splitting a tile into columns. To satisfy these scenarios, a first level tile may be split into tile rows and tile columns of second level tiles as described below.

For example, tile structure can be relaxed as follows. Tiles in the same picture are not required to be a particular number of tile rows. Further, tiles in the same picture are not required to be a particular number of tile columns. For signaling of flexible tiles, the following steps may be used. A first level tile structure may be defined by tile columns and tile rows as defined in HEVC. The tile columns and tile rows may be uniform or not uniform in size. Each of these tiles may be referred to as a first-level tile. A flag may be signaled to specify whether or not each first level tile is further divided into one or more tile columns and one or more tile rows. If a first-level tile is further divided, the tile columns and tile rows may be either uniform or not uniform in size. New tiles resulting from the division of first-level tiles are referred to as second-level tiles. The flexible tile structure may be limited to second-level tiles only, and hence no further split of any second-level tile is allowed in some examples. In other examples, further division of second-level tiles can be applied to create subsequent level tiles in a manner similar to the creation of second level tiles from the first level tiles.

For simplicity, when a first-level tile is divided into two or more second-level tiles, the division may always use uniform size tile columns and uniform tile rows. Derivation of tile locations, sizes, indices, and scanning order of flexible tiles defined by this approach is described below. For simplicity, when such flexible tile structure is used, a tile group may be constrained to include of one or more complete first-level tiles. In this example, when a tile group contains a second-level tile, all second-level tiles that originated from the division of the same first-level tile should be contained in the tile group. It can further be constrained that when such flexible tile structure is used, a tile group contains one or more tiles and together all tiles belong to a tile group that covers a rectangular region of a picture. In another aspect, when such flexible tile structure is used, a tile group contains one or more first-level tiles and together all tiles belong to a tile group that covers a rectangular region of a picture.

In an example, signaling of flexible tiles can be as follows. A minimum tile width and minimum tile height are defined values. A first level tile structure can be defined by tile columns and tile rows. The tile columns and tile rows may be uniform or non-uniform in size. Each of these tiles can be referred to as a first-level tile. A flag may be signaled to specify whether any of the first level tiles may be further divided. This flag may not be present when the width of each first level tile is not greater than twice of the minimum tile width, and the height of each first level tile is not greater than twice of the minimum tile height. When not present, the value of the flag is inferred to be equal to zero.

In an example, the following applies for each first level tile. A flag can be signaled to specify whether or not a first level tile is further divided into one or more tile columns and one or more tile rows. The presence of the flag can be constrained as follows. If the first-level tile width is greater than the minimum tile width or if the first-level tile height is greater than the minimum tile height, the flag is present/signaled. Otherwise, the flag is not present and the value of the flag is inferred to be equal to zero indicating the first-level tile is not further divided.

If a first-level tile is further divided, the number of tile columns and the number of tile rows for this division may further be signaled. The tile columns and tile rows may be either uniform or not uniform in size. Tiles resulting from the division of first-level tiles are referred to as second-level tiles. The presence of the number of tile columns and the number of tile rows can be constrained as follows. When the first-level tile width is less than twice of the minimum tile width, the number of tile columns may not be signaled and the number of tile columns value can be inferred to be equal to one. The signaling may employ a_minus1 syntax element so that the signaled syntax element value may be zero and the number of tile columns is the value of the syntax element plus one. This approach may further compress the signaling data. When the first-level tile height is less than twice of the minimum tile height, the number of tile rows may not be signaled and the value of the number of tile rows can be inferred to be equal to zero. The signaled syntax element value may be zero and the number of tile rows can be the value of the syntax element plus one to further compress the signaling data. Tiles resulting from the division of first-level tiles can be referred to as second-level tiles. The flexible tile structure may be limited to second-level tiles only, so that no further split of any second-level tile is allowed. In other examples, further division of second-level tiles can be applied in a similar manner to splitting a first-level tile into second-level tiles.

In an example, signaling of a flexible tile structure can be as follows. When a picture contains more than one tile, a signal, such as a flag, can be employed in a parameter set that is directly or indirectly referred to by a corresponding tile group. The flag can specify whether a corresponding tile structure is a uniform tile structure or non-uniform tile structure (e.g., a flexible tile structure as described herein). The flag may be called uniform_tile_structure_flag. When uniform_tile_structure_flag is equal to one, signaling of a HEVC-style uniform tile structure is employed, for example by signaling num_tile_columns_minus1 and num_tile_rows_minus1 to indicate a single level of uniform tiles. When uniform_tile_structure_flag is equal to zero, the following information may also be signaled. The number of tiles in a picture can be signaled by the syntax element num_tiles_minus2, which indicates the number of tiles in the picture (NumTilesInPic) is equal to num_tiles_minus2+2. This may result in bit savings during signaling since a picture may be considered to be a tile by default. For each tile, excluding the last one, the addresses of the first coding block (e.g., CTU) and last coding block of the tile are signaled. The address of a coding block can be the index of the block in a picture (e.g., index of CTU in picture). The syntax elements for such coding blocks may be tile_first_block_address[i] and tile_last_block_address[i]. These syntax elements may be coded as ue(v) or u(v). When the syntax elements are coded as u(v), the number of bits used for representing each of the syntax element is ceil (log 2(max number of the coding block in a picture)). The addresses of the first and last coding block of the last tile may not be signaled, and may instead be derived based on picture size in luma samples and the aggregation of all other tiles in the picture.

In an example, for each tile, excluding the last one, instead of signaling the addresses of the first and the last coding block of the tile, the address of the first coding block of the tile, and the width and the height of the tile may be signaled. In another example, for each tile, excluding the last one, instead of signaling the addresses of the first and the last coding block of the tile, the offset of the top left point of the tile relative to the original of the picture (e.g., the top left of the picture) and the width and the height of the tile may be signaled. In yet another example, for each tile, excluding the last one, instead of signaling the addresses of the first and the last coding block of the tile, the following information can be signaled. The width and the height of the tile may be signaled. Also, the location of each tile may not be signaled. Instead a flag may be signaled to specify whether to position the tile immediately to the right or immediately below the previous tile. This flag may be not present if the tile can only be to the right or can only be to the below the previous tile. The top left offset of the first tile may always be set to be the origin/top left of the picture (e.g., x=zero and y=zero).

For signaling efficiency, a set of unique tile sizes (e.g., width and height) may be signaled. This list of unique tile size may be referred to by index from the loop that includes signaling of each tile size. In some examples, the tile locations and sizes as derived from the signaled tile structure shall constrain the partition to ensure no gap and no overlap occurs between any tiles.

The following constraints may also apply. Tile shapes may be required to be rectangular (e.g., not raster scan shapes). The unit of tiles in a picture shall cover the picture without any gap and any overlapping among the tiles. When decoding is done with one core only, for coding of a current coding block (e.g., CTU) that are not at the left border of a picture, the left neighbor coding block shall be decoded before the current coding block. When decoding is done with one core only, for coding of a current coding block (e.g., CTU) that are not at the top border of a picture, a top neighbor coding block shall be decoded before the current coding block. When two tiles have tile indices that are next to each other (e.g., idx three and idx four) one of the following is true. The two tiles share vertical border and/or when the first tile has top left location at (Xa, Ya) with size (Wa and Ha representing its width and height) and when the second tile has top left location at (Xb, Yb) then Yb=Ya+Ha.

The following constraints may also apply. When a tile has more than one left neighbor tile, the height of the tile shall be equal to the sum of heights of all its left neighbor tiles. When a tile has more than one right neighbor tile, the height of the tile shall be equal to the sum of heights of all its left neighbor tiles. When a tile has more than one top neighbor tile, the width of the tile shall be equal to the sum of widths of all its top neighbor tiles. When a tile has more than one bottom neighbor tile, the width of the tile shall be equal to the sum of widths of all its bottom neighbor tiles.

The following is a specific example embodiment of the abovementioned aspects. The CTB raster and tile scanning process may be as follows. The list ColWidth[i] for i ranging from 0 to num_level1_tile_columns_minus1, inclusive, specifying the width of the i-th first-level tile column in units of CTBs, can be derived as follows.

```
if( uniform_level1_tile_spacing_flag )
  for( i = 0; i <= num_level1_tile_columns_minus1; i++ )
    ColWidth[ i ] = ( ( i + 1 ) * PicWidthInCtbsY ) /
( num_level1_tile_columns_minus1 + 1 ) –
      ( i * PicWidthInCtbsY ) / ( num_level1_tile_columns_minus1
+
      1 )
else {
ColWidth[ num_level1_tile_columns_minus1 ] = PicWidthInCtbsY   (6-1)
for( i = 0; i < num_level1_tile_columns_minus1; i++ ) {
  ColWidth[ i ] = tile_level1_column_width_minus1[ i ] + 1
  ColWidth[ num_tile_level1_columns_minus1 ] –= ColWidth[ i ]
}
}
```

The list RowHeight[j] for j ranging from 0 to num_level1_tile_rows_minus1, inclusive, specifying the height of the j-th tile row in units of CTBs, can be derived as follows:

```
if( uniform_level1_tile_spacing_flag )
  for( j = 0; j <= num_level1_tile_rows_minus1; j++ )
    RowHeight[ j ] = ( ( j + 1 ) * PicHeightInCtbsY ) / (
num_level1_tile_rows_minus1 + 1 ) –
      ( j * PicHeightInCtbsY ) / ( num_level1_tile_rows_minus1 +
      1 )
else {
RowHeight[ num_level1_tile_rows_minus1 ] = PicHeightInCtbsY   (6-2)
for( j = 0; j < num_level1_tile_rows_minus1; j++ ) {
  RowHeight[ j ] = tile_level1_row_height_minus1[ j ] + 1
  RowHeight[ num_level1_tile_rows_minus1 ] –= RowHeight[ j ]
}
}
```

The list colBd[i] for i ranging from 0 to num_level1_tile_columns_minus1+1, inclusive, specifying the location of the i-th tile column boundary in units of CTBs, can be derived as follows:

```
for( colBd 0 ] = 0, i = 0; i <= num_level1_tile_columns_minus1;
i++ )
  colBd[ i + 1 ] = colBd[ i ] + ColWidth[ i ]           (6-3)
```

The list rowBd[j] for j ranging from 0 to num_level1_tile_rows_minus1+1, inclusive, specifying the location of the j-th tile row boundary in units of CTBs, can be derived as follows:

```
for( rowBd[ 0 ] = 0, j = 0; j <= num_level1_tile_rows_minus1;
j++ )
  rowBd[ j + 1 ] = rowBd[ j ] + RowHeight[ j ]          (6-4)
```

The variable NumTilesInPic, specifying the number of tiles in a picture referring to the PPS, and the lists TileColBd[i], TileRowBd[i], TileWidth[i], and TileHeight[i] for i ranging from 0 to NumTilesInPic−1, inclusive, specifying the location of the i-th tile column boundary in units of CTBs, the location of the i-th tile row boundary in units of CTBs, the width of the i-th tile column in units of CTBs, and the height of the i-th tile column in units of CTBs, can be derived as follows:

```
for ( tileIdx = 0, i = 0; i < NumLevel1Tiles; i++ ) {
  tileX = i % ( num_level1_tile_columns_minus1 + 1 )
  tileY = i / ( num_level1_tile_columns_minus1 + 1 )
  if ( !level2_tile_split_flag[ i ] ) {                  (6-5)
    TileColBd[ tileIdx ] = colBd[ tileX ]
    TileRowBd[ tileIdx ] = rowBd[ tileY ]
    TileWidth[ tileIdx ] = ColWidth[ tileX ]
    TileHeight[ tileIdx ] = RowHeight[ tileY ]
    tileIdx++
  } else {
    for( k = 0; k <= num_level2_tile_columns_minus1[ i ]; k++ )
      colWidth2[ k ] = ( ( k + 1 ) * ColWidth[ tileX ] ) /
( num_level2_tile_columns_minus1[ i ] + 1 ) –
        ( k * ColWidth[ tileX ] ) / ( num_level2_tile_columns_minus1[ i ] + 1 )
    for( k = 0; k <= num_level2_tile_rows_minus1[ i ]; k++ )
      rowHeight2[ k ] = ( ( k + 1 ) * RowHeight[ tileY ] ) /
( num_level2_tile_rows_minus1[ i ] + 1 ) –
        ( k * RowHeight[ tileY ] ) / ( num_level2_tile_rows_minus1[ i ] + 1 )
    for( colBd2[ 0 ] = 0, k = 0; k <= num_level2_tile_columns_minus1[ i ]; k++ )
      colBd2[ k + 1 ] = colBd2[ k ] + colWidth2[ k ]
    for( rowBd2[ 0 ] = 0, k = 0; k <= num_level2_tile_rows_minus1[ i ]; k++ )
      rowBd2[ k + 1 ] = rowBd2[ k ] + rowHeight2[ k ]
    numSplitTiles = (num_level2_tile_columns_minus1[ i ] + 1) *
        (num_level2_tile_rows_minus1[ i ] + 1)
    for( k = 0; k < numSplitTiles; k++ ) {
      tileX2 = k % (num_level2_tile_columns_minus1[ i ] + 1)
      tileY2 = k / (num_level2_tile_columns_minus1[ i ] + 1)
      TileColBd[ tileIdx ] = colBd[ tileX ] + colBd2[ tileX2 ]
      TileRowBd[ tileIdx ] = rowBd[ tileY ] + rowBd2[ tileY2 ]
```

```
        TileWidth[ tileIdx ] = colWidth2[ tileX2 ]
        TileHeight[ tileIdx ] = rowHeight2[ tileY2 ]
        tileIdx++
      }
    }
  }
}
NumTilesInPic = tileIdx
```

The list CtbAddrRsToTs[ctbAddrRs] for ctbAddrRs ranging from 0 to PicSizeInCtbsY−1, inclusive, specifying the conversion from a CTB address in CTB raster scan of a picture to a CTB address in tile scan, can be derived as follows:

```
for (ctbAddrRs = 0; ctbAddrRs < PicSizeInCtbsY; ctbAddrRs++ ) {
tbX = ctbAddrRs % PicWidthInCtbsY
tbY = ctbAddrRs / PicWidthInCtbsYtileFound = FALSE
for ( tileIdx = NumTilesInPic − 1, i = 0; i < NumTilesInPic − 1 && !tileFound; i++
)
{                                                                              (6-6)
   tileFound = tbX < (TileColBd[ i ] + TileWidth[ i ] ) && tbY < ( TileRowBd[ i ]
+ TileHeight[ i ] )
   if (tileFound)
      tileIdx = i
}
CtbAddrRsToTs[ ctbAddrRs ] = 0
for( i = 0; i < tileIdx; i++ )
   CtbAddrRsToTs[ ctbAddrRs ] += TileHeight[ i ] * TileWidth[ i ]
CtbAddrRsToTs[ ctbAddrRs ] +=
      ( tbY − TileRowBd[ tileIdx ]
) * TileWidth[ tileIdx ] + tbX − TileColBd[ tileIdx ]
}
```

The list CtbAddrTsToRs[ctbAddrTs] for ctbAddrTs ranging from zero to PicSizeInCtbsY−1, inclusive, specifying the conversion from a CTB address in tile scan to a CTB address in CTB raster scan of a picture, can be derived as follows.

```
for( ctbAddrRs = 0; ctbAddrRs < PicSizeInCtbsY; ctbAddrRs++ )    (6-7)
CtbAddrTsToRs[ CtbAddrRsToTs[ ctbAddrRs ] ] = ctbAddrRs
```

The list TileId[ctbAddrTs] for ctbAddrTs ranging from zero to PicSizeInCtbsY−1, inclusive, specifying the conversion from a CTB address in tile scan to a tile ID, can be derived as follows.

```
for( i = 0, tileIdx = 0; i <= NumTilesInPic; i++, tileIdx++ )
   for( y = TileRowBd[ i ]; y < TileRowBd[ i + 1 ]; y++ )                      (6-8)
      for( x = TileColBd[ i ]; x < TileColBd[ i + 1 ]; x++ )
         TileId[ CtbAddrRsToTs[ y * PicWidthInCtbsY+ x ] ] = tileIdx
```

The list NumCtusInTile[tileIdx] for tileIdx ranging from zero to NumTilesInPic−1, inclusive, specifying the conversion from a tile index to the number of CTUs in the tile, can be derived as follows.

```
for (i=0; tileIdx=0; i<NumTilesInPic; i++, tileIdx++)

NumCtusInTile[tileIdx]=TileColWidth[tileIdx]*Tile-
   RowHeight[tileIdx]                                            (6-9)
```

An example picture parameter set RBSP syntax is as follows.

|  | Descriptor |
|---|---|
| pic_parameter_set_rbsp( ) { |  |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { |  |
|     num_level1_tile_columns_minus1 | ue(v) |
|     num_level1_tile_rows_minus1 | ue(v) |
|     uniform_level1_tile_spacing_flag | u(1) |
|     if( !uniform_level1_tile_spacing_flag ) { |  |
|       for( i = 0; i < num_level1_tile_columns_minus1; i++ ) |  |
|         level1_tile_column_width_minus1[ i ] | ue(v) |
|       for( i = 0; i < num_level1_tile_rows_minus1 ; i++ ) |  |
|         level1_tile_row_height_minus1[ i ] | ue(v) |
|     } |  |
|     level2_tile_present_flag | u(1) |
|     for( i = 0; level2_tile_present_flag && i < NumLevel1Tiles; i++ ) |  |
|     { |  |

|                                                                 | Descriptor |
| --------------------------------------------------------------- | ---------- |
|     level2_tile_split_flag[ i ]                                 | u(1)       |
|     if( level2_tile_split_flag ) {                              |            |
|         num_level2_tile_columns_minus1[ i ]                     | ue(v)      |
|         num_level2_tile_rows_minus1[ i ]                        | ue(v)      |
|     }                                                           |            |
|   }                                                             |            |
|   if( NumTilesInPic > 1 )                                       |            |
|     loop_filter_across_tiles_enabled_flag                       | u(1)       |
| }                                                               |            |
|   rbsp_trailing_bits( )                                         |            |
| }                                                               |            |

Example picture parameter set RBSP semantics are as follows. The num_level1_tile_columns_minus1 plus 1 specifies the number of level 1 tile columns partitioning the picture. The num_level1_tile_columns_minus1 shall be in the range of zero to PicWidthInCtbsY−1, inclusive. When not present, the value of num_level1_tile_columns_minus1 is inferred to be equal to zero. The num_level1_tile_rows_minus1 plus 1 specifies the number of level one tile rows partitioning the picture. num_level1_tile_rows_minus1 shall be in the range of zero to PicHeightInCtbsY−1, inclusive. When not present, the value of num_level1_tile_rows_minus1 is inferred to be equal to zero. The variable NumLevel1Tiles is set equal to (num_level1_tile_columns_minus1+1)*(num_level1_tile_rows_minus1+1). When single_tile_in_pic_flag is equal to zero, NumTilesInPic shall be greater than one. The uniform_level1_tile_spacing_flag is set equal to one to specify that level 1 tile column boundaries and likewise level 1 tile row boundaries are distributed uniformly across the picture. The uniform_level1_tile_spacing_flag is equal to zero to specify that level one tile column boundaries and likewise level one tile row boundaries are not distributed uniformly across the picture but signaled explicitly using the syntax elements level1_tile_column_width_minus1[i] and level1_tile_row_height_minus1[i]. When not present, the value of uniform_level1_tile_spacing_flag is inferred to be equal to one. The level1_tile_column_width_minus1[i] plus 1 specifies the width of the i-th level one tile column in units of CTBs. The level1_tile_row_height_minus1[i] plus 1 specifies the height of the i-th tile level one row in units of CTBs. The level2_tile_present_flag specifies that one or more level one tiles are divided into more tiles. The level2_tile_split_flag[i] plus 1 specifies that the i-th level one tile is divided into two or more tiles. The num_level2_tile_columns_minus1[i] plus 1 specifies the number of tile columns partitioning the i-th tile. The num_level2_tile_columns_minus1[i] shall be in the range of zero to ColWidth[i], inclusive. When not present, the value of num_level2_tile_columns_minus1[i] is inferred to be equal to zero. The num_level2_tile_rows_minus1[i] plus 1 specifies the number of tile rows partitioning the i-th tile. The num_level2_tile_rows_minus1[i] shall be in the range of zero to RowHeight[i], inclusive. When not present, the value of num_level2_tile_rows_minus1[i] is inferred to be equal to zero.

The following variables are derived by invoking the CTB raster and tile scanning conversion process: the list ColWidth[i] for i ranging from 0 to num_level1_tile_columns_minus1, inclusive, specifying the width of the i-th level 1 tile column in units of CTBs; the list RowHeight[j] for j ranging from 0 to num_level1_tile_rows_minus1, inclusive, specifying the height of the j-th level 1 tile row in units of CTBs; the variable NumTilesInPic, specifying the number of tiles in a picture referring to the PPS; the list Tile Width[i] for i ranging from 0 to NumTilesInPic, inclusive, specifying the width of the i-th tile in units of CTBs; the list TileHeight[i] for i ranging from 0 to NumTilesInPic, inclusive, specifying the height of the i-th tile in units of CTBs; the list TileColBd[i] for i ranging from 0 to NumTilesInPic, inclusive, specifying the location of the i-th tile column boundary in units of CTBs; the list TileRowBd[i] for j ranging from 0 to NumTilesInPic, inclusive, specifying the location of the i-th tile row boundary in units of CTBs; the list CtbAddrRsToTs[ctbAddrRs] for ctbAddrRs ranging from 0 to PicSizeInCtbsY−1, inclusive, specifying the conversion from a CTB address in the CTB raster scan of a picture to a CTB address in the tile scan; the list CtbAddrTsToRs[ctbAddrTs] for ctbAddrTs ranging from 0 to PicSizeInCtbsY−1, inclusive, specifying the conversion from a CTB address in the tile scan to a CTB address in the CTB raster scan of a picture; the list TileId[ctbAddrTs] for ctbAddrTs ranging from 0 to PicSizeInCtbsY−1, inclusive, specifying the conversion from a CTB address in tile scan to a tile ID; the list NumCtusInTile[tileIdx] for tileIdx ranging from 0 to PicSizeInCtbsY−1, inclusive, specifying the conversion from a tile index to the number of CTUs in the tile; and the list FirstCtbAddrTs[tileIdx] for tileIdx ranging from 0 to NumTilesInPic−1, inclusive, specifying the conversion from a tile ID to the CTB address in tile scan of the first CTB in the tile.

Example tile group header semantics are as follows. A tile_group_address specifies the tile address of the first tile in the tile group, where the tile address is equal to TileId [firstCtbAddrTs] as specified by Equation 6-8 with firstCtbAddrTs being is the CTB address in tile scan of the CTBs of the first CTU in the tile group. The length of tile_group_address is Ceil (Log 2(NumTilesInPic)) bits. The value of tile_group_address shall be in the range of zero to NumTilesInPic−1, inclusive, and the value of tile_group_address shall not be equal to the value of tile_group_address of any other coded tile group NAL unit of the same coded picture. When tile_group_address is not present it is inferred to be equal to zero.

The following is a second specific example embodiment of the abovementioned aspects. An example CTB raster and tile scanning process is as follows. The variable NumTilesInPic, specifying the number of tiles in a picture referring to the PPS, and the lists TileColBd[i], TileRowBd[i], TileWidth[i], and TileHeight[i] for i ranging from zero to NumTilesInPic−1, inclusive, specifying the location of the i-th tile column boundary in units of CTBs, the location of the i-th tile row boundary in units of CTBs, the width of the i-th tile column in units of CTBs, and the height of the i-th tile column in units of CTBs, are derived as follows.

```
for ( tileIdx = 0, i = 0; i < NumLevel1Tiles; i++ ) {
tileX = i % ( num_level1_tile_columns_minus1 + 1 )
tileY = i / ( num_level1_tile_columns_minus1 + 1 )
if ( !level2_tile_split_flag[ i ] ) {                                         (6-5)
  TileColBd[ tileIdx ] = colBd[ tileX ]
  TileRowBd[ tileIdx ] = rowBd[ tileY ]
  TileWidth[ tileIdx ] = ColWidth[ tileX ]
  TileHeight[ tileIdx ] = RowHeight[ tileY ]
  tileIdx++
} else {
  if ( uniform_level2_tile_spacing_flag[ i ] ) {
    for( k = 0; k <= num_level2_tile_columns_minus1[ i ]; k++ )
      colWidth2[ k ] = ( ( k + 1 ) * ColWidth[ tileX ] ) /
        ( num_level2_tile_columns_minus1[ i ] + 1 ) −
        ( k * ColWidth[ tileX ] ) / ( num_level2_tile_columns_minus1[ i ] + 1 )
    for( k = 0; k <= num_level2_tile_rows_minus1[ i ]; k++ )
      rowHeight2[ k ] = ( ( k + 1 ) * RowHeight[ tileY ] ) /
        ( num_level2_tile_rows_minus1[ i ] + 1 ) −
        ( k * RowHeight[ tileY ] ) / ( num_level2_tile_rows_minus1[ i ] + 1 )
  } else {
    colWidth2[ num_level2_tile_columns_minus1[ i ] ] = ColWidth[ tileX ] )
    for( k = 0; k <= num_level2_tile_columns_minus1[ i ]; k++ ) {
      colWidth2[ k ] = tile_level2_column_width_minus1[ k ] + 1
      colWidth2[ k ] −= colWidth2[ k ]
    }
    rowHeight2[ num_level2_tile_rows_minus1[ i ] ] = RowHeight[ tileY ] )
    for( k = 0; k <= num_level2_tile_rows_minus1[ i ]; k++ ) {
      rowHeigh2[ k ] = tile_level2_column_width_minus1[ k ] + 1
      rowHeight2[ k ] −= rowHeight2[ k ]
    }
  }
  for( colBd2[ 0 ] = 0, k = 0; k <= num_level2_tile_columns_minus1[ i ]; k++ )
    colBd2[ k + 1 ] = colBd2[ k ] + colWidth2[ k ]
  for( rowBd2[ 0 ] = 0, k = 0; k <= num_level2_tile_rows_minus1[ i ]; k++ )
    rowBd2[ k + 1 ] = rowBd2[ k ] + rowHeight2[ k ]
  numSplitTiles = (num_level2_tile_columns_minus1[ i ] + 1) *
    (num_level2_tile_rows_minus1[ i ] + 1)
  for( k = 0; k < numSplitTiles; k++ ) {
    tileX2 = k % (num_level2_tile_columns_minus1[ i ] + 1)
    tileY2 = k / (num_level2_tile_columns_minus1[ i ] + 1)
    TileColBd[ tileIdx ] = colBd[ tileX ] + colBd2[ tileX2 ]
    TileRowBd[ tileIdx ] = rowBd[ tileY ] + rowBd2[ tileY2 ]
    TileWidth[ tileIdx ] = colWidth2[ tileX2 ]
    TileHeight[ tileIdx ] = rowHeight2[ tileY2 ]
    tileIdx++
  }
}
}
NumTilesInPic = tileIdx
```

An example picture parameter set RBSP syntax is as follows.

|  | Descriptor |
|---|---|
| pic_parameter_set_rbsp( ) { |  |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { |  |
|     num_level1_tile_colunins_minus1 | ue(v) |
|     num_level1_tile_rows_minus1 | ue(v) |
|     uniform_level1_tile_spacing_flag | u(1) |
|     if( !uniform_level1_tile_spacing_flag ) { |  |
|       for( i = 0; i < num_level1_tile_columns_minus1; i++ ) |  |
|         level1_tile_column_width_minus1[ i ] | ue(v) |
|       for( i = 0; i < num_level1_tile_rows_minus1; i++ ) |  |
|         level1_tile_row_height_minus1[ i ] | ue(v) |
|     } |  |
|     level2_tile_present_flag | u(1) |
|     for( j = 0; level2_tile_present_flag && i < NumLevel1Tiles; i++ ) { |  |
|       level2_tile_split_flag[ i ] | u(1) |
|       if( level2_tile_split_flag ) { |  |
|         num_level2_tile_columns_minus1[ i ] | ue(v) |

-continued

| | Descriptor |
|---|---|
| `    num_level2_tile_rows_minus1[ i ]` | ue(v) |
| `    uniform_level2_tile_spacing_flag[ i ]` | u(1) |
| `    if( !uniform_level2_tile_spacing_flag[ i ] ) {` | |
| `      for( j = 0; j < num_level2_tile_columns_minus1[ i ]; j++ )` | |
| `        level2_tile_column_width_minus1[ j ]` | ue(v) |
| `      for( j = 0; j < num_level2_file_rows_minus1[ i ]; j++ )` | |
| `        level2_tile_row_height_minus1[ j ]` | ue(v) |
| `    }` | |
| `  }` | |
| `}` | |
| `  if( NumTilesInPic > 1 )` | |
| `    loop_filter_across_tiles_enabled_flag` | u(1) |
| `}` | |
| `rbsp_trailing_bits( )` | |
| `}` | |

Example picture parameter set RBSP semantics are as follows. The uniform_level2_tile_spacing_flag[i] is set equal to one to specify that level two tile column boundaries of the i-th level one tile and likewise level two tile row boundaries of the i-th level one tile are distributed uniformly across the picture. The uniform_level2_tile_spacing_flag[i] can be set equal to zero to specify that level two tile column boundaries of the i-th level one tile and likewise level two tile row boundaries of the i-th level one tile are not distributed uniformly across the picture but signaled explicitly using the syntax elements level2_tile_column_width_minus1[j] and level2_tile_row_height_minus1[j]. When not present, the value of uniform_level2_tile_spacing_flag[i] is inferred to be equal to one. The level2_tile_column_width_minus1[j] plus 1 specifies the width of the j-th level two tile column of the i-th level one tile in units of CTBs. The level2_tile_row_height_minus1[j] plus 1 specifies the height of the j-th tile level two row of the i-th level one tile in units of CTBs.

The following is a third specific example embodiment of the abovementioned aspects. An example picture parameter set RBSP syntax is as follows.

| | Descriptor |
|---|---|
| `pic_parameter_set_rbsp( ) {` | |
| `  pps_pic_parameter_set_id` | ue(v) |
| `  pps_seq_parameter_set_id` | ue(v) |
| `  transform_skip_enabled_flag` | u(1) |
| `  if ( ( PicWidthInCtbsY * CtbSizeY ) >= ( 2 * MinTileWidth ) ||` | |
| `        ( PicHeightInCtbsY * CtbSizeY ) >= ( 2 * MinTileHeight ) )` | |
| `    single_tile_in_pic_flag` | u(1) |
| `  if( !single_tile_in_pic_flag ) {` | |
| `    if ( PicWidthInCtbsY * CtbSizeY >= ( 2 * MinTileWidth ) )` | |
| `      num_level1_tile_columns_minus1` | ue(v) |
| `    if ( PicHeightInCtbsY * CtbSizeY >= ( 2 * MinTileHeight ) )` | |
| `      num_level1_tile_rows_minus1` | ue(v) |
| `    uniform_level1_tile_spacing_flag` | u(1) |
| `    if( !uniform_level1_tile_spacing_flag ) {` | |
| `      for( i = 0; i < num_level1_tile_columns_minus1; i++ )` | |
| `        level1_tile_column_width_minus1[ i ]` | ue(v) |
| `      for( i = 0; i < num_level1_tile_rows_minus1; i++ )` | |
| `        level1_tile_row_height_minus1[ i ]` | ue(v) |
| `    }` | |
| `    if( Level1TilesMayFurtherBeSplit )` | |
| `      level2_tile_present_flag` | u(1) |
| `    for( i = 0; level2_tile_present_flag && i < NumLevel1Tiles; i++ ) {` | |
| `      if ( ColWidth[ i ] * CtbSizeY > MinTileWidth ||` | |
| `           RowHeight[ i ] * CtbSizeY > MinTileHeight )` | |
| `        level2_tile_split_flag[ i ]` | u(1) |
| `      if( level2_tile_split_flag ) {` | |
| `        if( ColWidth[ i ] * CtbSizeY >= ( 2 * MinTileWidth ) )` | |
| `          num_level2_tile_columns_minus1[ i ]` | ue(v) |
| `        if ( RowHeight[ i ] * CtbSizeY >= ( 2 * MinTileHeight ) )` | |
| `          num_level2_tile_rows_minus1[ i ]` | ue(v) |
| `      }` | |
| `    }` | |
| `    if (NumTilesInPic > 1)` | |
| `      loop_filter_across_tiles_enabled_flag` | u(1) |
| `  }` | |
| `  rbsp_trailing_bits( )` | |
| `}` | |

An example picture parameter set RBSP semantics is as follows. Bitstream conformance may require that the following constraints apply. The value MinTile Width specifies the minimum tile width and shall be equal to two hundred fifty six luma samples. The value MinTileHeight specifies the minimum tile height and shall be equal to sixty four luma samples. The value of minimum tile width and minimum tile height may change according to profile and level definition. The variable Level1TilesMayBeFurtherSplit may be derived as follows:

```
Level1TilesMayBeFurtherSplit = 0
for ( i = 0, !Level1TilesMayBeFurtherSplit && i = 0; i <
NumLevel1Tiles;
i++ )
if ( ( ColWidth[ i ] * CtbSizeY >= ( 2 * MinTileWidth ) ) ||
    ( RowHeight[ i ] * CtbSizeY >= ( 2 * MinTileHeight ) ))
    Level1TilesMayBeFurtherSplit = 1
```

The level2_tile_present_flag specifies that one or more level tiles are divided into more tiles. When not present, the value of level2_tile_present_flag is inferred to be equal to zero. The level2_tile_split_flag[i] plus 1 specifies that the i-th level one tile is divided into two or more tiles. When not present, the value of level2_tile_split_flag[i] is inferred to be equal to zero.

The following is a fourth specific example embodiment of the abovementioned aspects. Each tile location and size may be signaled. The syntax to support such tile structure signaling can be as tabulated below. The tile_top_left_address [i] and tile_bottom_right_address[i] are the CTU index within the picture that indicate the rectangular area covered by the tile. The number of bits to signal these syntax elements should be enough to represent the max number of CTUs in the picture.

| | Descriptor |
|---|---|
| pic_parameter_set_rbsp( ) { | |
| ... | . |
| single_tile_in_pic_flag | u(1) |
| if( !single_tile_in_pic_flag ) { | |
|   tile_size_unit_idc | ue(v) |
|   uniform_tile_flag | u(1) |
|   if( uniform_tile_flag ) { | |
|     num_tile_columns_minus1 | ue(v) |
|     num_tile_rows_minus1 | ue(v) |
|   } | |
|   else { | |
|     num_tiles_minus2 | ue(v) |
|     for( i = 0; i < (num_tiles_minus2 + 2); i++ ) { | |
|       tile_top_left_address[ i ] | u(v) |
|       tile_bottom_right_address[ i ] | u(v) |
|     } | |
|   } | |
|   loop_filter_across_tiles_enabled_flag | u(1) |
| } | |
| rbsp_trailing_bits( ) | |
| } | |

Each tile location and size may be signaled. The syntax to support such tile structure signaling can be as tabulated below. The tile_top_left_address[i] is the CTU index of the first CTU in the tile in the order of a CTU raster scan of a picture. Tile width and tile height specify the size of the tile. Some bits may be saved when signaling these two syntax elements by first signaling the common tile size unit.

| | Descriptor |
|---|---|
| pic_parameter_set_rbsp( ) { | |
| ... | . |
| single_tile_in_pic_flag | u(1) |
| if( !single_tile_in_pic_flag ) { | |
|   tile_size_unit_idc | ue(v) |
|   uniform_tile_flag | u(1) |
|   if( uniform_tile_flag ) { | |
|     num_tile_columns_minus1 | ue(v) |
|     num_tile_rows_minus1 | ue(v) |
|   } | |
|   else { | |
|     num_tiles_minus2 | ue(v) |
|     for( i = 0; i < (num_tiles_minus2 + 2); i++ ) { | |
|       tile_top_left_address[ i ] | u(v) |
|       tile_width_minus1[ i ] | ue(v) |
|       tile_height_minus1[ i ] | ue(v) |
|     } | |
|   } | |
|   loop_filter_across_tiles_enabled_flag | u(1) |
| } | |
| rbsp_trailing_bits( ) | |
| } | |

Alternatively, the signaling can be as follows.

| | Descriptor |
|---|---|
| pic_parameter_set_rbsp( ) { | |
| ... | . |
| single_tile_in_pic_flag | u(1) |
| if( !single_tile_in_pic_flag ) { | |
|   tile_size_unit_idc | ue(v) |
|   uniform_tile_flag | u(1) |
|   if( uniform_tile_flag ) { | |
|     num_tile_columns_minus1 | ue(v) |
|     num_tile_rows_minus1 | ue(v) |
|   } | |
|   else { | |
|     num_tiles_minus2 | ue(v) |
|     for( i = 0; i < (num_tiles_minus2 + 2); i++ ) { | |
|       tile_x_offset[ i ] | ue(v) |
|       tile_y_offset[ i ] | ue(v) |
|       tile_width_minus1[ i ] | ue(v) |
|       tile_height_minus1[ i ] | ue(v) |
|     } | |
|   } | |
|   loop_filter_across_tiles_enabled_flag | u(1) |
| } | |
| rbsp_trailing_bits( ) | |
| } | |

In another example, each tile size can be signaled as follows. For signaling a flexible tile structure, the location of each tile may not be signaled. Instead a flag may be signaled to specify whether to put the tile immediately to the right of or immediately below the previous tile. This flag may be not present if the tile can only be to the right or can only be below the current tile.

The values of tile_x_offset[i] and tile_y_offset[i] can be derived by the following ordered steps.

tile_x_offset[ 0 ] and tile_y_offset[ 0 ] are set equal to 0.
maxWidth is set equal to tile_width[ 0 ] and maxHeight is set equal to tile_height[ 0 ]
runningWidth is set equal to tile_width[ 0 ] and runningHeight is set equal to
tile_height[ 0 ]
lastNewRowHeight is set equal to 0
TilePositionCannotBeInferred = false
For i > 0, the following applies:
Let the value isRight be set as follows:
if runningWidth + tile_width[ i ] <= PictureWidth, then isRight = = 1
else, isRight = = 0
Let the value isBelow is set as follows:
if runningHeight + tile_height[ i ] <= PictureHeight, then isBelow = = 1
else, isBelow = = 0
If isRight = = 1 && isBelow = = 1 then TilePositionCannotBeInferred = true
If isRight = = 1 && isBelow = = 0 then the following apply:
right_tile_flag[ i ] = 1
tile_x_offset[ i ] = runningWidth.
tile_y_offset[ i ] = (runningWidth == maxWidth) ? 0 : lastNewRowHeight
lastNewRowHeight = (runningWidth == maxWidth ) ? 0 : lastNewRowHeight
else if isRight = = 0 && isBelow = = 1 then the following apply:
right_tile_flag[ i ] = 0
tile_y_offset[ i ] = runningHeight
tile_x_offset[ i ] = (runningHeight == maxHeight) ? 0 : tile_x_offset[ i − 1 ]
lastNewRowHeight = (runningHeight == maxHeight && runningWidth ==
maxWidth ) ? runningHeight: lastNewRowHeight
else if isRight = = 1 && isBelow = = 1 && right_tile_flag[ i ] = = 1 then the following
apply:
tile_x_offset[ i ] = runningWidth.
tile_y_offset[ i ] = (runningWidth == maxWidth ) ? 0 : lastNewRowHeight
lastNewRowHeight = (runningWidth == maxWidth ) ? 0 : lastNewRowHeight
else (i.e., isRight = = 1 && isBelow = = 1 && right_tile_flag[ i ] = = 0) then the
following apply:
tile_y_offset[ i ] = runningHeight
tile_x_offset[ i ] = (runningHeight == maxHeight) ? 0 : tile_x_offset[ i − 1 ]
lastNewRowHeight = (runningHeight == maxHeight && runningWidth ==
maxWidth) ? runningHeight : lastNewRowHeight
if right_tile_flag[ i ] = = 1, the following apply:
runningWidth = runningWidth + tile_width[ i ]
if runningWidth > maxWidth, then set maxWidth equal to runningWidth
runningHeight is equal to tile_y_offset[ i ] + tile_height[ i ]
else (i.e., right_tile_flag[ i ] = = 0), the following apply:
runningHeight = runningHeight + tile_height[ i ]
if runningHeight > maxHeight, then set maxHeight equal to runningHeight
runningWidth is equal to tile_x_offset[ i ] + tile_width[ i ]

The preceding can be described in pseudocode as follows.

```
tile_x_offset[0] = 0
tile_y_offset[0] = 0
maxWidth = tile_width[0]
maxHeight = tile_height[0]
runningWidth = tile_width[0]
runningHeight = tile_height[0]
lastNewRowHeight = 0
isRight = false
isBelow = false
TilePositionCannotBeInferred = false
for( i = 1; i < num_tiles_minus2 + 2; i++ ) {
  TilePositionCannotBeInferred = false
  isRight = ( runningWidth + tile_width[i] <= PictureWidth ) ? true : false
  isbelow = ( runningHeight + tile_height[i] <= PictureHeight ) ? true : false
    if (!isRight && !isBelow)
      //Error. This case shall not happen!
  if (isRight && isBelow)
    TilePositionCannotBeInferred = true
    if (isRight && !isBelow) {
    right_tile_flag[i] = true
    tile_x_offst[i] = runningWidth
    tile_y_offset[i] = (runningWidth == maxWidth) ? 0 : last-
NewRowHeight
      lastNewRowHeight = tile_y_offset[i]
  }
  else if (!isRight && isBelow) {
    right_tile_flag[i] = false
    tile_y_offset[i] = runningHeight
    tile_x_offset[i] = (runningHeight == maxHeight) ? 0 :
    tile_x_offset[i − 1]
    lastNewRowHeight = (runningHeight == maxHeight &&
runningWidth == maxWidth) ?
      runningHeight : lastNewRowHeight
  }
  else if ( right_tile_flag[i] ) {
    tile_x_offst[i] = runningWidth
    tile_y_offset[i] = (runningWidth == maxWidth) ? 0 : lastNewRowHeight
    lastNewRowHeight = tile_y_offset[i]
  }
  else {
    tile_y_offset[i] = runningHeight
    tile_x_offset[i] = (runningHeight == maxHeight) ? 0 :
    tile_x_offset[i − 1]
    lastNewRowHeight = (runningHeight == maxHeight &&
runningWidth == maxWidth) ?
      runningHeight : lastNewRowHeight
  }
  if ( right_tile_flag[i] ) {
    runningWidth += tile_width[i]
    if ( runningWidth > maxWidth ) maxWidth = runningWidth
    runningHeight = tile_y_offset[i] + tile_height[i]
  }
  else {
    runningHeight += tile_height[i]
    if ( runningHeight > maxHeight ) maxHeight = runningHeight
    runningWidth = tile_x_offset[i] + tile_width[i]
  }
}
```

| | Descriptor |
|---|---|
| pic_parameter_set_rbsp( ) { | |
| ... | |
|   single_tile_in_pic_flag | u(1) |
|   if( !single_tile_in_pic_flag ) { | |
|     tile_size_unit_idc | ue(v) |
|     uniform_tile_flag | u(1) |
|     if( uniform_tile_flag ) { | |
|       num_tile_columns_minus1 | ue(v) |
|       num_tile_rows_minus1 | ue(v) |
|     } | |
|     else { | |
|       num_tiles_minus2 | ue(v) |
|       for( i = 0; i < (num_tiles_minus2 + 2); i++ ) { | |
|         tile_width_minus1 [ i ] | ue(v) |
|         tile_height_minus1 [ i ] | ue(v) |
|         if( TilePositionCannotBeInferred ) | |
|           right_tile_flag[ i ] | u(1) |
|       } | |
|     } | |
|     loop_filter_across_tiles_enabled_flag | u(1) |
|   } | |
|   rbsp_trailing_bits( ) | |
| } | |

The following is an implementation of deriving the size of the last tile in pseudocode.

```
tile_x_offset[0] = 0
tile_y_offset[0] = 0
maxWidth = tile_width[0]
maxHeight = tile_height[0]
runningWidth = tile_width[0]
runningHeight = tile_height[0]
lastNewRowHeight = 0
isRight = false
isBelow = false
TilePositionCannotBeInferred = false
for( i = 1; i < num_tiles_minus2 + 2; i++ ) {
currentTileWidth = ( i == num_tiles_minus2 + 1 ) ? (PictureWidth − runningWidth) % PictureWidth
                : tile_width[i]
currentTileHeight = ( i == num_tiles_minus2 + 1 ) ? (PictureHeight − runningHeight) % PictureHeight
                : tile_Height[i]
isRight = ( runningWidth + currentTileWidth <= PictureWidth ) ? true : false
isbelow = ( runningHeight + currentTileHeight <= PictureHeight ) ? true : false
if (!isRight && !isBelow)
   //Error. This case shall not happen!
if (isRight && isBelow)
   TilePositionCannotBeInferred = true
if (isRight && !isBelow) {
   right_tile_flag[i] = true
   tile_x_offst[i] = runningWidth
   tile_y_offset[i] = (runningWidth = maxWidth) ? 0 : lastNewRowHeight
   lastNewRowHeight = tile_y_offset[i]
}
else if (!isRight && isBelow) {
   right_tile_flag[i] = false
   tile_y_offset[i] = runningHeight
   tile_x_offset[i] = (runningHeight = maxHeight ) ? 0 : tile_x_offset[i − 1]
   lastNewRowHeight = (runningHeight == maxHeight && runningWidth == maxWidth) ?
           runningHeight : lastNewRowHeight
}
else if ( right_tile_flag[i] ) {
   tile_x_offst[i] = runningWidth
   tile_y_offset[i] = (runningWidth = maxWidth) ? 0 : lastNewRowHeight
   lastNewRowHeight = tile_y_offset[i]
}
else {
   tile_y_offset[i] = runningHeight
   tile_x_offset[i] = (runningHeight == maxHeight) ? 0 : tile_x_offset[i − 1]
   lastNewRowHeight = (runningHeight == maxHeight && runningWidth == maxWidth) ?
           runningHeight : lastNewRowHeight
}
}
if ( right_tile_flag[i] ) {
runningWidth += currentTileWidth
if ( runningWidth > maxWidth ) maxWidth = runningWidth
runningHeight = tile_y_offset[i] + currentTileHeight
}
else {
runningHeight += currentTileHeight
if ( runningHeight > maxHeight ) maxHeight = runningHeight
runningWidth = tile_x_offset[i] + currentTileWidth
}
```

| | Descriptor |
|---|---|
| pic_parameter_set_rbsp( ) { | |
| ... | . |
|   single_tile_in_pic_flag | u(1) |
|   if( !single_tile_in_pic_flag ) { | |
|     tile_size_unit_idc | ue(v) |
|     uniform_tile_flag | u(1) |
|     if( uniform_tile_flag ) { | |
|       num_tile_columns_minus1 | ue(v) |
|       num_tile_rows_minus1 | ue(v) |
|     } | |
|     else { | |
|       num_tiles_minus2 | ue(v) |
|       for( i = 0; i < (num_tiles_minus2 + 1); i++ ) { | |
|         tile_width_minus1[ i ] | ue(v) |
|         tile_height_minus1[ i ] | ue(v) |
|         if( TilePositionCannotBeInferred ) | |
|           right_tile_flag[ i ] | u(1) |
|       } | |
|     } | |
|     loop_filter_across_tiles_enabled_flag | u(1) |
|   } | |
|   rbsp_trailing_bits( ) | |
| } | |

For further signaling bit-saving, the number of unique tile sizes can be signaled to support tabulation of the unit tile size. Tile size can then be referenced by index only.

| | Descriptor |
|---|---|
| pic_parameter_set_rbsp( ) { | |
| ... | . |
|   single_tile_in_pic_flag | u(1) |
|   if( !single_tile_in_pic_flag ) { | |
|     tile_size_unit_idc | ue(v) |
|     uniform_tile_flag | u(1) |
|     if( uniform_tile_flag ) { | |
|       num_tile_columns_minus1 | ue(v) |
|       num_tile_rows_minus1 | ue(v) |
|     } | |
|     else { | |
|       num_tiles_minus2 | ue(v) |
|       num_unique_tile_sizes | ue(v) |
|       for( i = 0; i < num_unique_tile_sizes; i++ ) { | |
|         preset_tile_width_minus1[ i ] | ue(v) |
|         preset_tile_height_minus1[ i ] | ue(v) |
|       } | |
|       for( i = 0; i < (num_tiles_minus2 + 2); i++ ) { | |
|         if ( num_unique_tile_sizes ) | |
|           tile_size_idx[ i ] | u(v) |
|         else { | |
|           tile_width_minus1[ i ] | ue(v) |
|           tile_height_minus1[ i ] | ue(v) |
|         } | |
|         if( TilePositionCannotBeInferred ) | |
|           right_tile_flag[ i ] | u(1) |
|       } | |
|     } | |
|     loop_filter_across_tiles_enabled_flag | u(1) |
|   } | |
|   rbsp_trailing_bits( ) | |
| } | |

Figure 9:
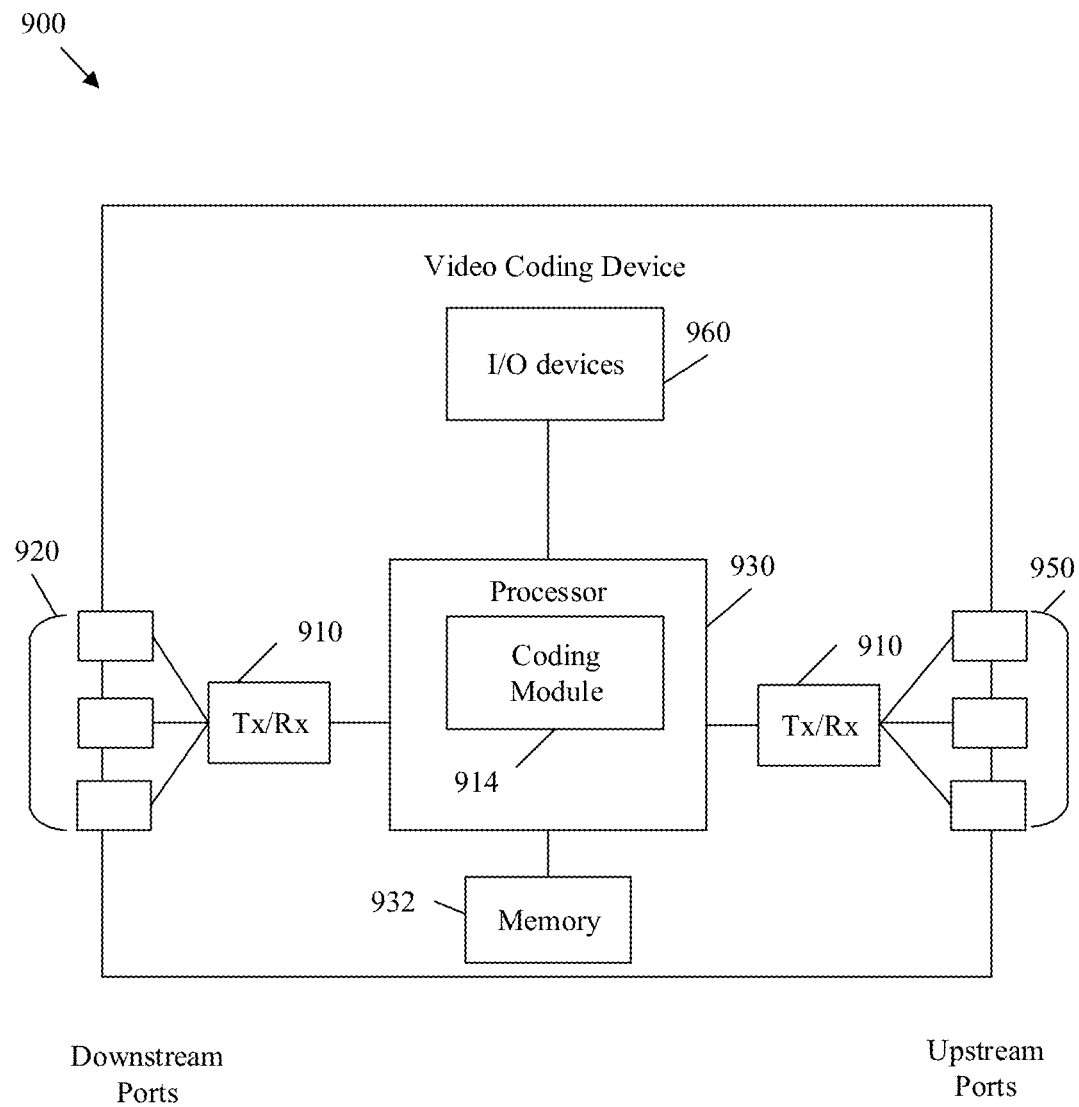
FIG. 9 is a schematic diagram of an example video coding device.

FIG. 9 is a schematic diagram of an example video coding device 900. The video coding device 900 is suitable for implementing the disclosed examples/embodiments as described herein. The video coding device 900 comprises downstream ports 920, upstream ports 950, and/or transceiver units (Tx/Rx) 910, including transmitters and/or receivers for communicating data upstream and/or downstream over a network. The video coding device 900 also includes a processor 930 including a logic unit and/or central processing unit (CPU) to process the data and a memory 932 for storing the data. The video coding device 900 may also comprise electrical, optical-to-electrical (OE) components, electrical-to-optical (EO) components, and/or wireless communication components coupled to the upstream ports 950 and/or downstream ports 920 for communication of data via electrical, optical, or wireless communication networks. The video coding device 900 may also include input and/or output (I/O) devices 960 for communicating data to and from a user. The I/O devices 960 may include output devices such as a display for displaying video data, speakers for outputting audio data, etc. The I/O devices 960 may also include input devices, such as a keyboard, mouse, trackball, etc., and/or corresponding interfaces for interacting with such output devices.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the downstream ports 920, Tx/Rx 910, upstream ports 950, and memory 932. The processor 930 comprises a coding module 914. The coding module 914 implements the disclosed embodiments described herein, such as methods 100, 1000, and 1100, mechanism 600, and/or application 700 which may employ a bitstream 500 and/or an image partitioned according to flexible video tiling scheme 800. The coding module 914 may also implement any other method/mechanism described herein. Further, the coding module 914 may implement a codec system 200, an encoder 300, and/or a decoder 400. For example, the coding module 914 can partition a picture into first level tiles and partition first level tiles into second level tiles. The coding module 914 can also signal supporting data to indicate the configuration of first level tiles and second level tiles. The coding module 914 further supports employing such mechanisms to combine sub-pictures at different resolutions into a single picture for various use cases as described herein. As such, the coding module 914 improves the functionality of the video coding device 900 as well as addresses problems that are specific to the video coding arts. Further, the coding module 914 effects a transformation of the video coding device 900 to a different state. Alternatively, the coding module 914 can be implemented as instructions stored in the memory 932 and executed by the processor 930 (e.g., as a computer program product stored on a non-transitory medium).

The memory 932 comprises one or more memory types such as disks, tape drives, solid-state drives, read only memory (ROM), random access memory (RAM), flash memory, ternary content-addressable memory (TCAM), static random-access memory (SRAM), etc. The memory 932 may be used as an over-flow data storage device, to store programs when such programs are selected for execution, and to store instructions and data that are read during program execution.

Figure 10:
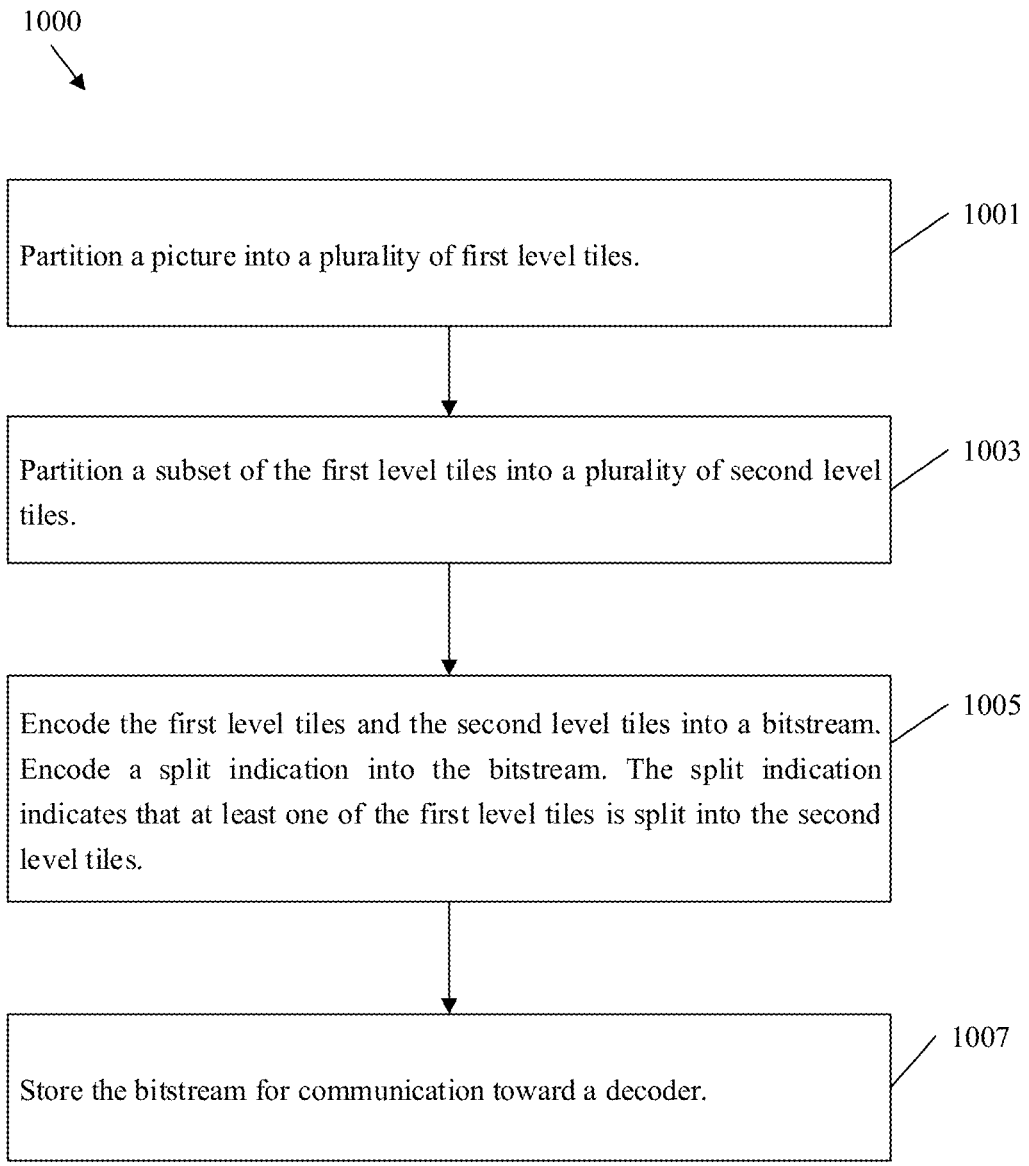
FIG. 10 is a flowchart of an example method of signaling a configuration of a flexible tiling scheme.

FIG. 10 is a flowchart of an example method 1000 of signaling a configuration of a flexible tiling scheme, such as flexible video tiling scheme 800. Method 1000 may be employed by an encoder, such as a codec system 200, an encoder 300, and/or a video coding device 900 when performing method 100, mechanism 600, and/or supporting application 700. Further, method 1000 may be employed to generate a bitstream 500 for transmission to a decoder, such as decoder 400.

Method 1000 may begin when an encoder receives a video sequence including a plurality of images/pictures and determines to encode that video sequence into a bitstream, for example based on user input. As an example, the video sequence, and hence the images, can be encoded at a plurality of resolutions. At step 1001, a picture is partitioned into a plurality of first level tiles. At step 1003, a subset of the first level tiles are partitioned into a plurality of second level tiles. In some examples, the first level tiles outside the subset contain picture data at a first resolution and second level tiles contain picture data at a second resolution different from the first resolution. In some examples, each second level tile contains a single slice of picture data from the picture. In some examples, the first level tiles and the second level tiles are assigned into one or more tile groups. The tiles in a corresponding tile group (e.g., containing second level tiles) may be constrained to cover a rectangular portion of the picture.

At step 1005, the first level tiles and the second level tiles are encoded into a bitstream. Further, a split indication is encoded into the bitstream to indicate the configuration of the flexible tiling scheme employed. The split indication may indicate that at least one of the first level tiles is split into a plurality of the second level tiles. In some examples, the split indication is encoded in a picture parameter set as a level two tile split flag. The level two tile split flag can be set for each of the first level tiles that are partitioned to create the second level tiles. In some examples, data explicitly indicating whether a first level tile is partitioned into second level tiles is omitted from the bitstream for first level tiles with a width that is less than a minimum width threshold and a height is less than a minimum height threshold. This is because such tiles are too small to be further split, and hence the lack of split can be inferred from the tile size. This approach may save bits in the encoding, and hence increase coding efficiency. In some examples, the configuration of the tiles can be signaled by encoding second level tile rows and second level tile columns for partitioned first level tiles. For example, the second level tile rows and the second level tile columns may be encoded in a picture parameter set associated with the picture. In some examples, the configuration of the tiles can be signaled by encoding second level tile rows and second level tile columns in a parameter set. The second level tile rows and second level tile columns may indicate the configuration of the second level tiles with respect to a corresponding first level tile. In some aspects, the second level tile rows and second level tile columns can be omitted from a picture parameter set for partitioned first level tiles with a width that is less than twice the minimum width threshold and a height is less than twice the minimum height threshold. This is because such tiles are too small to be further split, and hence the lack of second level tile columns and second level tile rows can be inferred from the tile size. This approach may save bits in the encoding, and hence increase coding efficiency.

At step 1007, the bitstream is stored for communication toward a decoder upon request.

Figure 11:
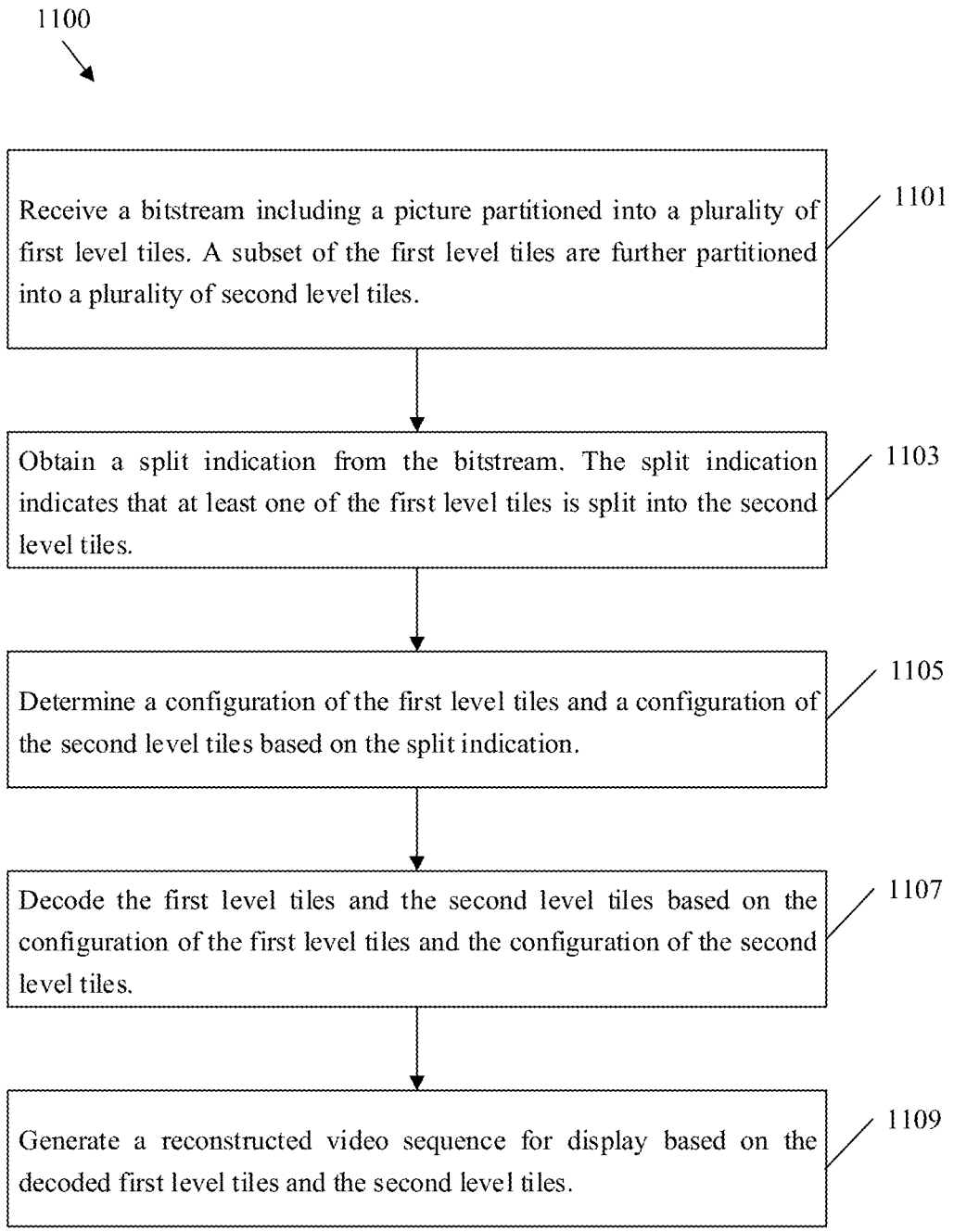
FIG. 11 is a flowchart of an example method of decoding an image based on a signaled configuration of a flexible tiling scheme.

FIG. 11 is a flowchart of an example method 1100 of decoding an image based on a signaled configuration of a flexible tiling scheme, such as flexible video tiling scheme 800. Method 1100 may be employed by a decoder, such as a codec system 200, a decoder 400, and/or a video coding device 900 when performing method 100, mechanism 600, and/or supporting application 700. Further, method 1100 may be employed upon receiving a bitstream 500 from an encoder, such as encoder 300.

Method 1100 may begin when a decoder begins receiving a bitstream of coded data representing a video sequence, for example as a result of method 1000. The bitstream may contain video data from video sequences coded at a plurality of resolutions. At step 1101, a bitstream is received, for example from an encoder or an intermediate file server. The bitstream includes an encoded video sequence including a picture partitioned into a plurality of first level tiles. A subset of the first level tiles are further partitioned into a plurality of second level tiles. In some examples, each second level tile may contain a single slice of picture data from the picture. In some examples, the first level tiles outside the subset (e.g., the first level tiles not partitioned into second level tiles) contain picture data at a first resolution and second level tiles contain picture data at a second resolution different from the first resolution. Also, in some examples the first level tiles and the second level tiles may be assigned into one or more tile groups such that tiles in a corresponding tile group containing second level tiles are constrained to cover a rectangular portion of the picture.

At step 1103, a split indication is obtained from the bitstream. The split indication indicates that at least one of the first level tiles is split into the second level tiles. Accordingly, the split indication can act to signal the configuration of the tiling scheme used to partition the picture. In some examples, the split indication is obtained from a picture parameter set in a level two tile split flag. For example, the level two tile split flag can be set for each of the first level tiles that are partitioned to create the second level tiles. In some examples, split indications and other data explicitly indicating whether a first level tile is partitioned into second level tiles can be omitted from the bitstream for first level tiles with a width that is less than a minimum width threshold and a height is less than a minimum height threshold. This is because such tiles are too small to be further split, and hence the lack of split can be inferred from the tile size. This approach may save bits in the encoding, and hence increase coding efficiency.

At step 1105, a configuration of the first level tiles and a configuration of the second level tiles are determined, for example based on the split indication of step 1103. In some examples, additional information from the bitstream may be employed to determine the configurations for the tiles. For example, second level tile rows and second level tile columns may be obtained from the bitstream for partitioned first level tiles. The second level tile rows and the second level tile columns may be obtained from a picture parameter set associated with the picture. The configuration of the first level tiles and the configuration of the second level tiles can be determined based on the second level tile rows and the second level tile columns (e.g., as well as similar row and column data for the first level tiles). In some examples, the second level tile rows and second level tile columns can be omitted from the picture parameter set for partitioned first level tiles with a width that is less than twice the minimum width threshold and a height is less than twice the minimum height threshold. This is because such tiles are too small to be further split, and hence the lack of second level tile columns and second level tile rows can be inferred from the tile size. This approach may save bits in the bitstream encoding, and hence increase coding efficiency.

At step 1107, the first level tiles and the second level tiles are decoded based on the configuration of the first level tiles and the configuration of the second level tiles as determined according to the split indication(s), tile row data, tile column data, and/or other configuration data as described herein. At step 1109, a reconstructed video sequence can be generated for display based on the decoded first level tiles and the second level tiles.

Figure 12:
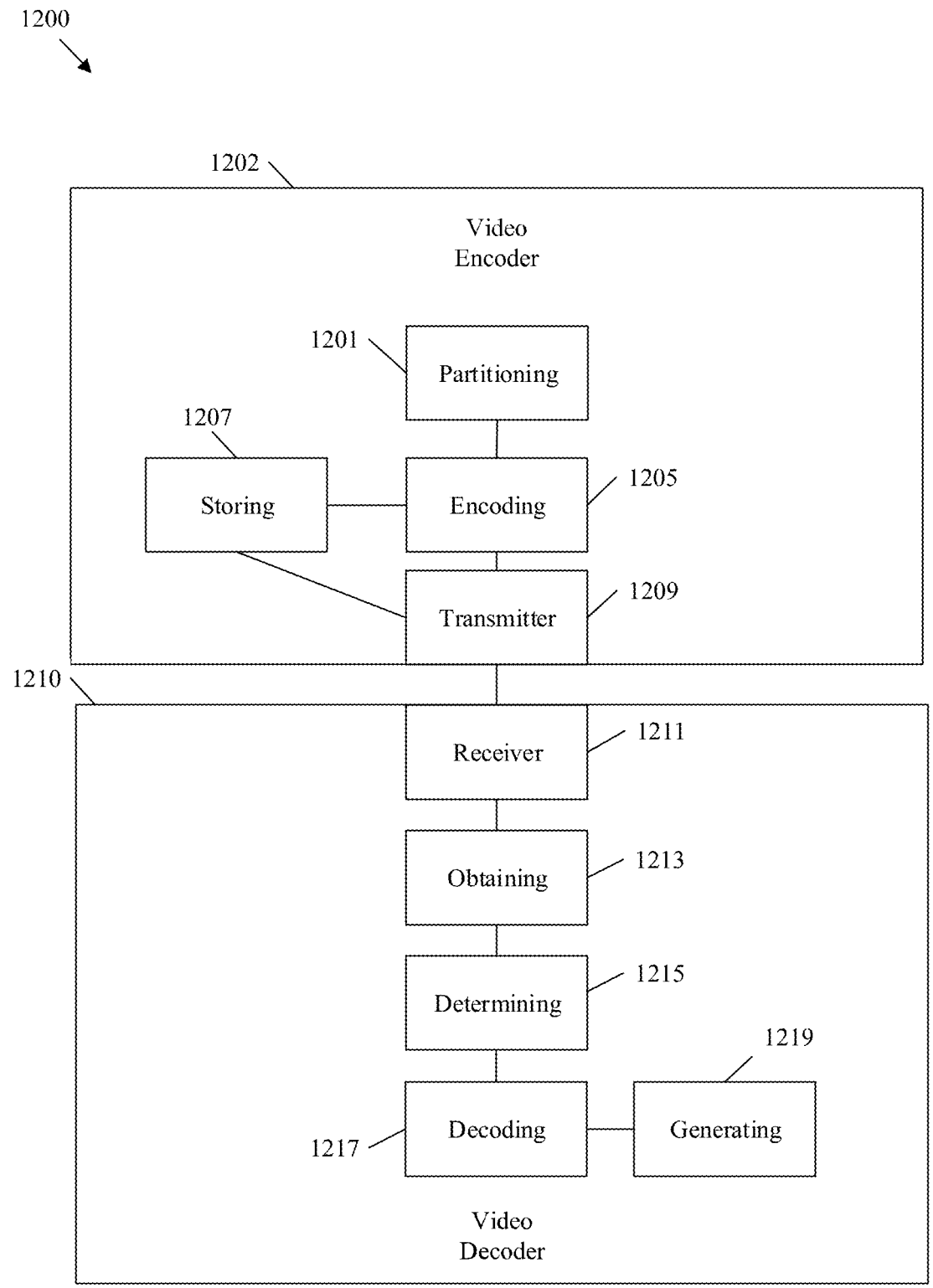
FIG. 12 is a schematic diagram of an example system for coding a video sequence by employing a flexible tiling scheme.

FIG. 12 is a schematic diagram of an example system 1200 for coding a video sequence by employing a flexible tiling scheme, such as flexible video tiling scheme 800.

System 1200 may be implemented by an encoder and a decoder such as a codec system 200, an encoder 300, a decoder 400, and/or a video coding device 900. Further, system 1200 may be employed when implementing method 100, 1000, 1100, mechanism 600, and/or application 700. System 1200 may also encode data into a bitstream, such as bitstream 500, and decode such a bitstream for display to a user.

The system 1200 includes a video encoder 1202. The video encoder 1202 comprises a partitioning module 1201 for partitioning a picture into a plurality of first level tiles and partitioning a subset of the first level tiles into a plurality of second level tiles. The video encoder 1202 further comprises an encoding module 1205 for encoding the first level tiles and the second level tiles into a bitstream and encoding a split indication into the bitstream, the split indication indicating that at least one of the first level tiles is split into the second level tiles. The video encoder 1202 further comprises a storing module 1207 for storing the bitstream for communication toward a decoder. The video encoder 1202 further comprises a transmitting module 1209 for transmitting the bitstream toward a decoder. The video encoder 1202 may be further configured to perform any of the steps of method 1000.

The system 1200 also includes a video decoder 1210. The video decoder 1210 comprises a receiving module 1211 for receiving a bitstream including a picture partitioned into a plurality of first level tiles, wherein a subset of the first level tiles are further partitioned into a plurality of second level tiles. The video decoder 1210 further comprises an obtaining module 1213 for obtaining a split indication from the bitstream, the split indication indicating that at least one of the first level tiles is split into the second level tiles. The video decoder 1210 further comprises a determining module 1215 for determining a configuration of the first level tiles and a configuration of the second level tiles based on the split indication. The video decoder 1210 further comprises a decoding module 1217 for decoding the first level tiles and the second level tiles based on the configuration of the first level tiles and the configuration of the second level tiles. The video decoder 1210 further comprises a generating module 1219 for generating a reconstructed video sequence for display based on the decoded first level tiles and the second level tiles. The video decoder 1210 may be further configured to perform any of the steps of method 1100.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented in an encoder, comprising:
   partitioning a picture into a plurality of first level tiles;
   partitioning a subset of the first level tiles into a plurality of second level tiles;
   encoding the first level tiles and the second level tiles into a bitstream; and
   encoding a split indication into the bitstream, the split indication indicating that at least one of the first level tiles is split into the second level tiles.

2. The method of claim 1, wherein the first level tiles outside the subset contain picture data at a first resolution and the second level tiles contain picture data at a second resolution different from the first resolution.

3. The method of claim 1, wherein the split indication is a level two tile split flag encoded in a picture parameter set, and wherein the level two tile split flag is set for each of the first level tiles that are partitioned to create the second level tiles.

4. The method of claim 1, wherein each of the second level tiles contains a single slice of picture data from the picture.

5. The method of claim 1, further comprising encoding second level tile rows and second level tile columns into the bitstream for partitioned first level tiles, wherein the second level tile rows and the second level tile columns are encoded into a picture parameter set associated with the picture, and wherein a configuration of the first level tiles and a configuration of the second level tiles are determined based on the second level tile rows and the second level tile columns.

6. The method of claim 1, wherein data explicitly indicating whether a first level tile is partitioned into the second level tiles is omitted from the bitstream for the first level tiles with a width that is less than a minimum width threshold and a height is less than a minimum height threshold.

7. The method of claim 1, wherein the second level tiles are assigned into one or more tile groups such that tiles in a corresponding tile group containing the second level tiles are constrained to cover a rectangular portion of the picture.

8. The method of claim 1, wherein second level tile rows and second level tile columns are omitted from a picture parameter set for partitioned first level tiles with a width that is less than twice a minimum width threshold and a height is less than twice a minimum height threshold.

9. An encoding device, comprising:
   a memory storing instructions; and
   a processor coupled to the memory, the processor configured to execute the instructions to cause the encoding device to:
   partition a picture into a plurality of first level tiles;
   partition a subset of the first level tiles into a plurality of second level tiles;

encode the first level tiles and the second level tiles into a bitstream; and encode a split indication into the bitstream, the split indication indicating that at least one of the first level tiles is split into the second level tiles.

10. The encoding device of claim 9, wherein the second level tiles are assigned into one or more tile groups such that tiles in a corresponding tile group containing the second level tiles are constrained to cover a rectangular portion of the picture.

11. The encoding device of claim 9, wherein the first level tiles outside the subset contain picture data at a first resolution and the second level tiles contain picture data at a second resolution different from the first resolution.

12. The encoding device of claim 9, further comprising a transmitter configured to transmit the bitstream toward a decoding device.

13. A non-transitory computer-readable storage medium storing an encoded bitstream and one or more instructions that, when executed by at least one processor, cause a decoding device to generate a video based on the bitstream, the bitstream comprising:

a picture partitioned into a plurality of first level tiles;

a subset of the first level tiles partitioned into a plurality of second level tiles; and a split indication indicating that at least one of the first level tiles is split into the second level tiles.

14. The non-transitory computer-readable recording medium of claim 13, wherein the first level tiles outside the subset contain picture data at a first resolution and the second level tiles contain picture data at a second resolution different from the first resolution.

15. The non-transitory computer-readable recording medium of claim 13, wherein the split indication is a level two tile split flag encoded in a picture parameter set, and wherein the level two tile split flag is set for each of the first level tiles that are partitioned to create the second level tiles.

16. The non-transitory computer-readable recording medium of claim 13, wherein each of the second level tiles contains a single slice of picture data from the picture.

17. The non-transitory computer-readable recording medium of claim 13, wherein the bitstream further comprises a picture parameter set associated with the picture, and wherein second level tile rows and second level tile columns for partitioned first level tiles are in the picture parameter set.

18. The non-transitory computer-readable recording medium of claim 13, wherein data explicitly indicating whether a first level tile is partitioned into the second level tiles is omitted from the bitstream for the first level tiles with a width that is less than a minimum width threshold and a height is less than a minimum height threshold.

19. The non-transitory computer-readable recording medium of claim 13, wherein the first level tiles and the second level tiles are included in one or more tile groups such that tiles in a corresponding tile group containing the second level tiles are constrained to cover a rectangular portion of the picture.

20. The non-transitory computer-readable recording medium of claim 13, wherein second level tile rows and second level tile columns are omitted from a picture parameter set for partitioned first level tiles with a width that is less than twice a minimum width threshold and a height is less than twice a minimum height threshold.

* * * * *